United States Patent
Lam

(10) Patent No.: US 9,134,925 B1
(45) Date of Patent: *Sep. 15, 2015

(54) SYSTEM AND METHOD FOR DISTRIBUTED COMPUTING IN NON-VOLATILE MEMORY

(71) Applicant: SanDisk Technologies, Inc., Plano, TX (US)

(72) Inventor: William Kwei-Cheung Lam, Newark, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,336

(22) Filed: Mar. 27, 2015

Related U.S. Application Data

(63) Continuation of application No. 14/290,305, filed on May 29, 2014, now Pat. No. 9,003,109.

(51) Int. Cl.
G06F 12/00 (2006.01)
G06F 13/00 (2006.01)
G06F 3/06 (2006.01)

(52) U.S. Cl.
CPC ............ *G06F 3/0688* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 5,953,738 A | 9/1999 | Rao | |
| 7,867,831 B2 | 1/2011 | Shin et al. | |
| 8,187,936 B2 | 5/2012 | Alsmeier et al. | |
| 8,452,927 B2 | 5/2013 | Nochimowski et al. | |
| 9,003,109 B1 | 4/2015 | Lam | |
| 2003/0131186 A1 | 7/2003 | Buhr | |
| 2005/0138314 A1 | 6/2005 | Liang et al. | |
| 2009/0300274 A1 | 12/2009 | Luo et al. | |
| 2010/0277979 A1 | 11/2010 | Kang et al. | |
| 2011/0055471 A1 | 3/2011 | Thatcher et al. | |
| 2012/0217572 A1 | 8/2012 | Shin et al. | |
| 2012/0299005 A1 | 11/2012 | Lee | |
| 2013/0191555 A1 | 7/2013 | Liu | |
| 2013/0246692 A1 | 9/2013 | Macor | |
| 2014/0075135 A1 | 3/2014 | Choi et al. | |

OTHER PUBLICATIONS

Application as Filed for U.S. Appl. No. 14/133,979, filed Dec. 19, 2013, 121 pages.

Application as Filed for U.S. Appl. No. 14/136,103, filed Dec. 20, 2013, 56 pages.

Arya, P. "A Survey of 3D NAND Flash Memory," *EECS Int'l Graduate Program, National Chiao Tung University*, 2012, pp. 1-11.

(Continued)

*Primary Examiner* — Sean D Rossiter
(74) *Attorney, Agent, or Firm* — Brinks Gilson & Lione

(57) ABSTRACT

A system and method are disclosed for incorporating mathematical and/or logical functionality within a memory system (such as a solid state drive (SSD)). The mathematical and/or logical functionality may comprise an arithmetic logic unit (ALU). The ALU may be resident in one or both of flash memory chips or the SSD controller. When resident in the flash memory chips, a single ALU or multiple ALUs may be used. For example, a single ALU may be assigned to one, some, or each block of flash memory within the flash memory chip. As another example, an ALU may be assigned to a sub-block construct, such as to each bit line in the block. Having ALUs resident in the SSD enables more processing to be performed within the SSD and reduces the need to transmit data outside of the SSD for processing.

25 Claims, 12 Drawing Sheets

(56) References Cited

OTHER PUBLICATIONS

Jang et al. "Vertical Cell Array Using TCAT (Terabit Cell Array Transistor) Technology for Ultra High Density NAND Flash Memory," *2009 Symposium on VLSI Technology Digest of Technical Papers*, 2009, pp. 192-193.

Ishida, K.; et al. "13.2 A 1.8V 30nJ Adaptive Program-Voltage (20V) Generator for 3D-Integrated NAND Flash SSD," *ISSCC 2009 / Session 13 Flash Memory 13.2, IEEE*, 2009, pp. 1-3, http://ieeexplore.ieee.org/stamp/stamp.jsp?tp=&arnumber=4977396&tag=1.

Nowak, E. et al. "Intrinsic Fluctuations in Vertical NAND Flash Memories," *2012 Symposium on VLSI Technology Digest of Technical Papers*, 2012, pp. 21-22.

The International Search Report and Written Opinion from corresponding International Patent Application No. PCT/US2015/029730 dated Jul. 16, 2015.

SYSTEM AND METHOD FOR DISTRIBUTED COMPUTING IN NON-VOLATILE MEMORY

REFERENCE TO RELATED APPLICATION

This application is a continuation of U.S. application Ser. No. 14/290,305 (now U.S. Pat. No. 9,003,109), which is incorporated by reference herein in its entirety.

TECHNICAL FIELD

This application relates generally to managing data in a system. More specifically, this application relates to distributing computing in a non-volatile memory.

BACKGROUND

Data storage devices may take one of several forms. One form is a hard disk drive (HDD), in which data is stored on disks coated with magnetic material. Typically, an HDD includes multiple rapidly rotating disks with magnetic heads arranged on a moving actuator arm to read data from and write data to the disk surfaces. Another form of the data storage device is a solid state drive (SSD). In contrast to using disks in a HDD, an SSD uses integrated circuit assemblies to store data. An SSD can use electronic interfaces compatible with traditional block input/output (I/O) of HDD. In this regard, an SSD may easily replace an HDD in common applications.

BRIEF SUMMARY

A system and method are disclosed for incorporating mathematical and/or logical functionality within a memory system (such as a solid state drive (SSD)). The mathematical and/or logical functionality may comprise an arithmetic logic unit (ALU). The ALU may be resident in various parts of the memory system. In an SSD, which may include an SSD controller and one or a plurality of memory chips, the ALU(s) may reside in one or both of flash memory chip(s) or the SSD controller. When resident in the flash memory chips, a single ALU or multiple ALUs may be used. For example, a single ALU may be assigned to one, some, or each block of flash memory within the flash memory chip. As another example, an ALU may be assigned to a sub-block construct, such as to each bit line in the block. Having ALUs resident in the memory system, such as the SSD, enables more processing to be performed within the SSD and reduces the need to transmit data outside of the SSD for processing. Further, having ALUs resident in the memory system, such as the SSD, enables the memory system to perform various functions, such as database functions, image processing functions, and/or file system functions.

According to a first aspect, a solid state drive (SSD) comprising memory is disclosed. The SSD includes: an interface configured to communicate with a host device; and a controller in communication with the interface with the controller comprising an arithmetic logic unit (ALU). The controller is configured to: receive a command from the host device; in response to receiving the command, use the ALU in order to generate one or more results; and send at least a part of the one or more results or an indication of the one or more results to the host device.

In a second aspect, a method for an electronic integrated circuit to communicate with one of multiple hosts is disclosed. The method includes: communicating, via a first set of electrical contacts using a host protocol, with a first host, the electronic integrated circuit embedded within the first host, the first set of electrical contacts on an exterior of a package of the electronic integrated circuit; receiving one or more signals to select the second set of electrical contacts for testing of at least a part of the electronic integrated circuit, the second set of electrical contacts on the exterior of the package of the electronic integrated circuit; and based on the one or more signals received, switching, using a host interface switch, from communicating with some or all of the first set of electrical contacts and communicating with some or all of the second set of electrical contacts using the host protocol in order for the second host to test the at least a part of the electronic integrated circuit.

In a third aspect, a memory integrated circuit chip configured for use in a solid state drive (SSD) is disclosed. The memory integrated circuit chip includes: an interface configured to communicate with an SSD controller for the SSD; a memory; and a controller in communication with the interface and the memory. The controller comprises an arithmetic logic unit (ALU) and is configured to: receive a command from the SSD controller; in response to receiving the command, use the ALU in order to generate one or more results; and send at least a part of the one or more results or an indication of the one or more results to the SSD controller.

In a fourth aspect, a method for operating a memory integrated circuit chip configured for use in a solid state drive (SSD) is provided. The method includes: receiving a command from an SSD controller of the SSD via an interface; in response to receiving the command, using an arithmetic logic unit (ALU) in order to generate one or more results, the ALU resident in the memory integrated circuit chip; and send at least a part of the one or more results or an indication of the one or more results to the SSD controller.

In a fifth aspect, a memory integrated circuit chip configured for use in a solid state drive (SSD) is disclosed. The memory integrated circuit chip includes: an interface configured to communicate with an SSD controller for the SSD; a memory; and a controller in communication with the interface and the memory. The controller comprises mathematical functionality or logic functionality, the logic functionality comprising XOR functionality and at least one of AND functionality or OR functionality. The controller is configured to: receive a command from the SSD controller; in response to receiving the command, use the mathematical functionality or logic functionality in order to generate one or more results; and send at least a part of the one or more results or an indication of the one or more results to the SSD controller. More specifically, the memory integrated circuit chip may include the controller that comprises mathematical functionality and logic functionality, with the logic functionality comprising XOR functionality, AND functionality and OR functionality.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
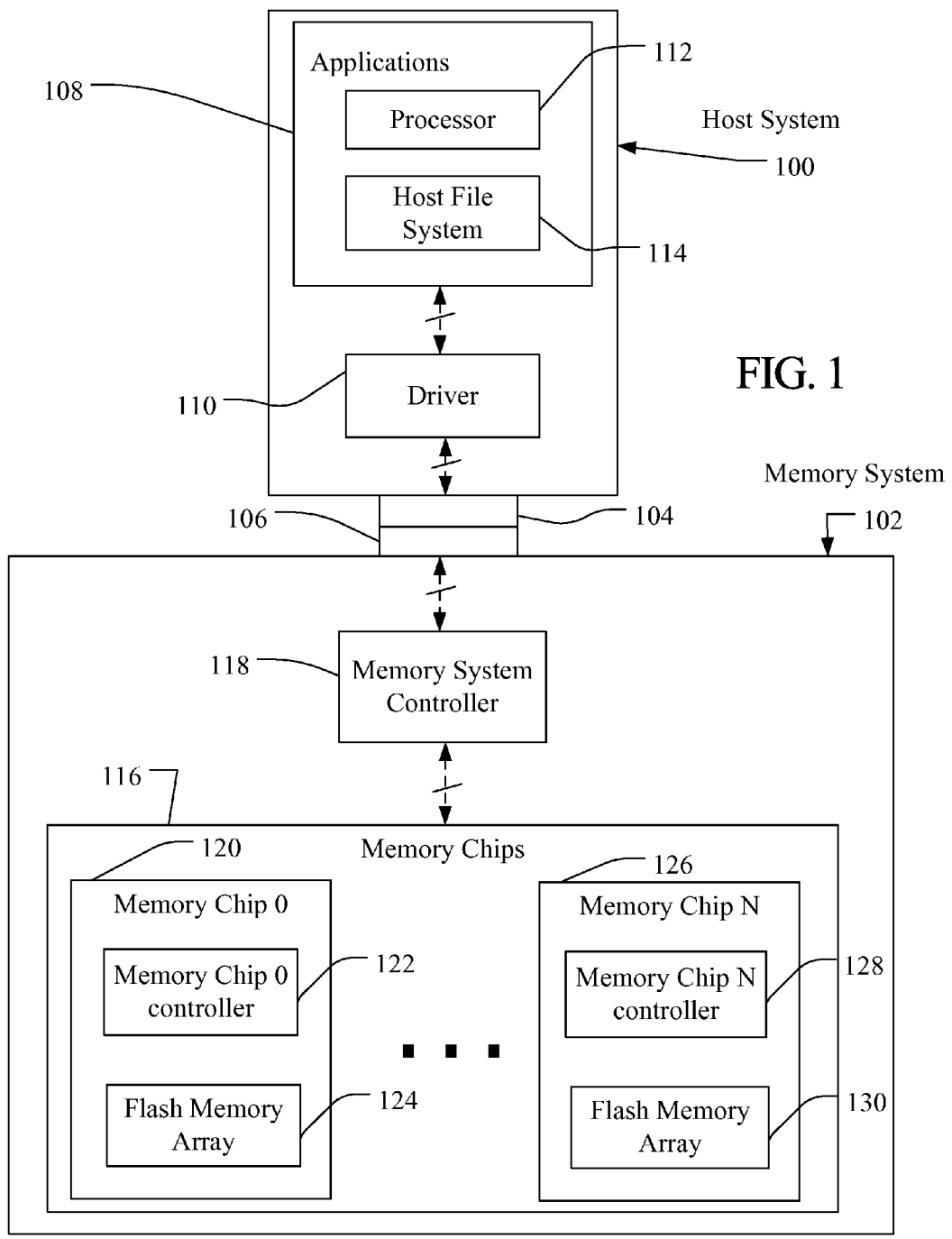
FIG. 1 illustrates a host connected with a memory device.

A host device may include one or more peripheral devices. The peripheral device may be in communication with (such as connected to) the host device, expanding the functionality of the host device. One type of peripheral device is a storage device, which increases the storage capacity of the host device thereby increasing the functionality of the host device. As discussed in more detail below, the storage device may comprise a solid state drive (SSD) in a first embodiment or a flash drive in a second embodiment.

Typically, the host device may perform one or more functions. As discussed in more detail below, the functions may include database functions, image processing functions, and/or file system functions. The listed functions are merely for illustration purposes. Other functions are contemplated. In one aspect of the invention, some or all of a function is performed in the storage device. In this regard, the performance of part (or all) of the function may be distributed to the storage device.

In one embodiment, a function (or a set of functions) may be performed by the storage device. In one aspect, only one part of the storage device performs the function (or the set of functions). As discussed in more detail below, the SSD includes an SSD controller chip and one or more flash memory chips. In one implementation, the flash memory chip (such as the controller within the flash memory chip) performs the function (or the set of functions). As another implementation, the SSD controller chip (such as the controller within the SSD controller chip) performs the function (or the set of functions). In another aspect, multiple parts of the storage device may perform a function (or a set of functions). As discussed in more detail below, a single function may be divided into multiple sub-functions, with one part of the storage device (such as the SSD controller chip) performing one sub-function and another part of the storage device (such as the flash memory chip) performing another sub-function.

In an alternate embodiment, a plurality of functions may be divided such that a first subset of functions are performed by the storage device and a second subset of functions are performed by the host device. For example, one set of functions relates to file system management, as discussed below. A first subset of functions relating to file system management (such as lower complexity file system functions) may be performed by the storage device and a second subset of functions relating to file system management (such as higher complexity file system functions) may be performed by the host device. In another embodiment, a single function may be divided into a first sub-function and a second sub-function, with the first sub-function being performed by the storage device and the second sub-function being performed by the host device. For example, one function is to process an image. More specifically, image processing may include a first image processing step and a second image processing step. As discussed in more detail below, the storage device (such as the controller within the flash memory chip and/or the SSD controller chip) may perform the first image processing step, and send the results to the host device in order for the host device to perform the second image processing step on the results. In still another embodiment, a plurality of functions, typically performed by the host device, may all be performed by the storage device.

In order to perform part (or all) of the function typically performed by the host device, the storage device may include additional logic and/or computing capability. In one embodiment, the storage device includes mathematical computational functionality and/or logic functionality. For example, the mathematical computation functionality may comprise arithmetic and/or algebraic computation functionality (e.g., addition, subtraction, multiplication, division, etc.). As another example, the logic functionality may comprise any one or any multiple combination (including all) of the following logical operations: AND, NAND, OR, NOR, XOR, NOT, etc. In this regard, the storage device may perform mathematical computational operations and/or logic operations with the mathematical computational functionality and/or logic functionality, respectively. The mathematical computational operations and/or logic operations performed by the storage device may be used to perform the functions discussed above, such as the database functions, image processing functions, and/or file system functions. As discussed in more detail below, a particular function (such as a database function) may be composed of one or more mathematical computational operations and/or logic operations.

The mathematical computational operations and/or logic operations, using mathematical computational functionality and/or logic functionality, may be performed by the storage device using one or more components. In one embodiment, the storage device includes an arithmetic logic unit (ALU). As discussed in more detail below, the ALU is configured to perform integer arithmetic and logical operations (e.g., AND, NAND, OR, NOR, XOR, NOT). In an alternate embodiment, the storage device may include a floating point unit (FPU), which may be configured to perform non-integer calculations, such as division operations, which may generate a fraction, or a "floating point" number. In still an alternate embodiment, the storage device may include both an ALU and an FPU.

As discussed above, in one embodiment, one type of storage device is a solid state drive (SSD). The SSD may include an SSD controller and memory to store the data within the SSD (e.g., NAND flash non-volatile memory or DRAM volatile memory). The SSD controller may be embodied on an integrated circuit chip and the memory, such as the flash non-volatile memory, may be embodied on one or more integrated circuit memory chips separate from the SSD controller integrated circuit chip. In an alternate embodiment, another type of storage device is a flash drive.

In one embodiment, the mathematical computational functionality and/or logic functionality may reside in the integrated circuit memory chips. For example, a plurality of integrated circuit memory chips may communicate with an SSD controller. One, some, or all of the plurality of integrated circuit memory may include an ALU, an FPU, or an ALU/FPU. The flash memory chips may thus perform computation or logic operations at the request of the host system. In this regard, computing may be distributed from the host system to the storage device, such as to the integrated circuit memory chips on the SSD. Further, the computing by the integrated circuit memory chips may be performed more quickly since the data need not be sent outside of the integrated circuit memory chips for processing and since the processing may be performed in parallel (e.g., within the integrated circuit memory chips).

In an alternate embodiment, the mathematical computational functionality and/or logic functionality may reside in the SDD controller integrated circuit chip. In still an alternate embodiment, the mathematical computational functionality and/or logic functionality may reside in the SDD controller integrated circuit chip and one, some, or all of the plurality of integrated circuit memory chips.

FIG. 1 illustrates a host system 100 and a memory system 102. The host system 100 may comprise any type of host device, such as a stationary computer system (e.g., a desktop computer) or a mobile computer system (e.g., a laptop computer, a smartphone, a tablet computer, or the like).

The host system 100 of FIG. 1 may be viewed as having two major parts, insofar as the memory system 102 is concerned, made up of a combination of circuitry and software. They are an applications portion 108 and a driver portion 110 that interfaces with the memory system 102. In a desktop computer, laptop computer, smartphone, tablet computer, for examples, the applications portion 110 may include a processor (e.g., a CPU) 112 running word processing, graphics, control or other popular application software, as well as the file system 114 for managing data on the host system 100. In a camera, cellular telephone or other host system that is primarily dedicated to performing a single set of functions, the applications portion 108 includes the software that operates the camera to take and store pictures, the cellular telephone to make and receive calls, and the like.

The memory system 102 may be flash memory embedded within the host, such as in the form of an SSD installed in the host system with mating parts 104 and 106 connecting the host system 100 to the SSD. Alternatively, the memory system 102 may be in the form of a card that is removably connected to the host system 100 through mating parts 104 and 106 of a mechanical and electrical connector. A flash memory configured for use as an internal or embedded SSD drive may look similar to the schematic of FIG. 1, with the primary difference being the location of the memory system 102 internal to the host system 100. An SSD may be in the form of discrete modules that are drop-in replacements for rotating magnetic disk drives.

Further, in one embodiment, the memory, such as the flash memory, may comprise two-dimensional memory. In an alternate embodiment, the memory may comprise three-dimensional memory. In still an alternate embodiment, the memory may comprise a combination of two-dimensional memory and three-dimensional memory.

The memory system 102 of FIG. 1 may comprise a semiconductor memory device and include non-volatile memory, such as one or more memory chips 116, and a memory system controller 118. In an alternate embodiment, the memory system 102 may include both volatile and non-volatile memory. The memory system controller 118 interfaces with the host system 100, to which the memory system 102 is connected for passing data back and forth, and controls memory chips 116.

The host system 100 may communicate with the memory system for multiple purposes. One purpose is for the host system 102 to store data on and/or read data from the memory system. For example, the host system 100 may send data to the memory system 102 for storage on the one or more memory chips 116 of the memory system 102. As another example, the host system 100 may request data from the memory system 102 that is stored on the one or more memory chips 116. When communicating with the memory system, the host system 100 may send logical addresses of data, such as in the form of a range of logical block addresses (LBAs). The memory system controller 118 may then convert the LBAs, in one or more steps, to the actual physical addresses on the memory chips 116. The memory system controller 118 may perform a logical address-to-actual physical address conversion in order to map to the actual physical addresses. For example, the LBAs from the host system 100 may be mapped to memory system internal logical addresses, and the memory system internal logical addresses are mapped to the actual physical addresses. As another example, the LBAs from the host system 100 may be mapped directly to the actual physical addresses.

FIG. 1 illustrates that the memory chips 116 may include a plurality of memory chips, such as 0 to N chips, where N is an integer number. Each of the memory chips within memory chips 116 may be the same as one another (as illustrated in FIG. 1), or may be different. For example, memory chip 0 (120) may include memory chip 0 controller (122) and flash memory array (124). Likewise, memory chip N (126) may include memory chip N controller (128) and flash memory array (130).

As discussed above, a part of the memory system 102 may include mathematical computational functionality and/or logic functionality. In one embodiment, the mathematical computational functionality and/or logic functionality may reside in a part of the memory chips 116, such as one, some, or all of memory chips (e.g., in memory chip 0 controller 122 and memory chip N controller 128). In an alternate embodiment, the mathematical computational functionality and/or logic functionality may reside in memory system controller 118. In still an alternate embodiment, the mathematical computational functionality and/or logic functionality may reside in a part of the memory chips 116, such as in memory chip 0 controller 122 and memory chip N controller 128, and in memory system controller 118.

Figure 2:
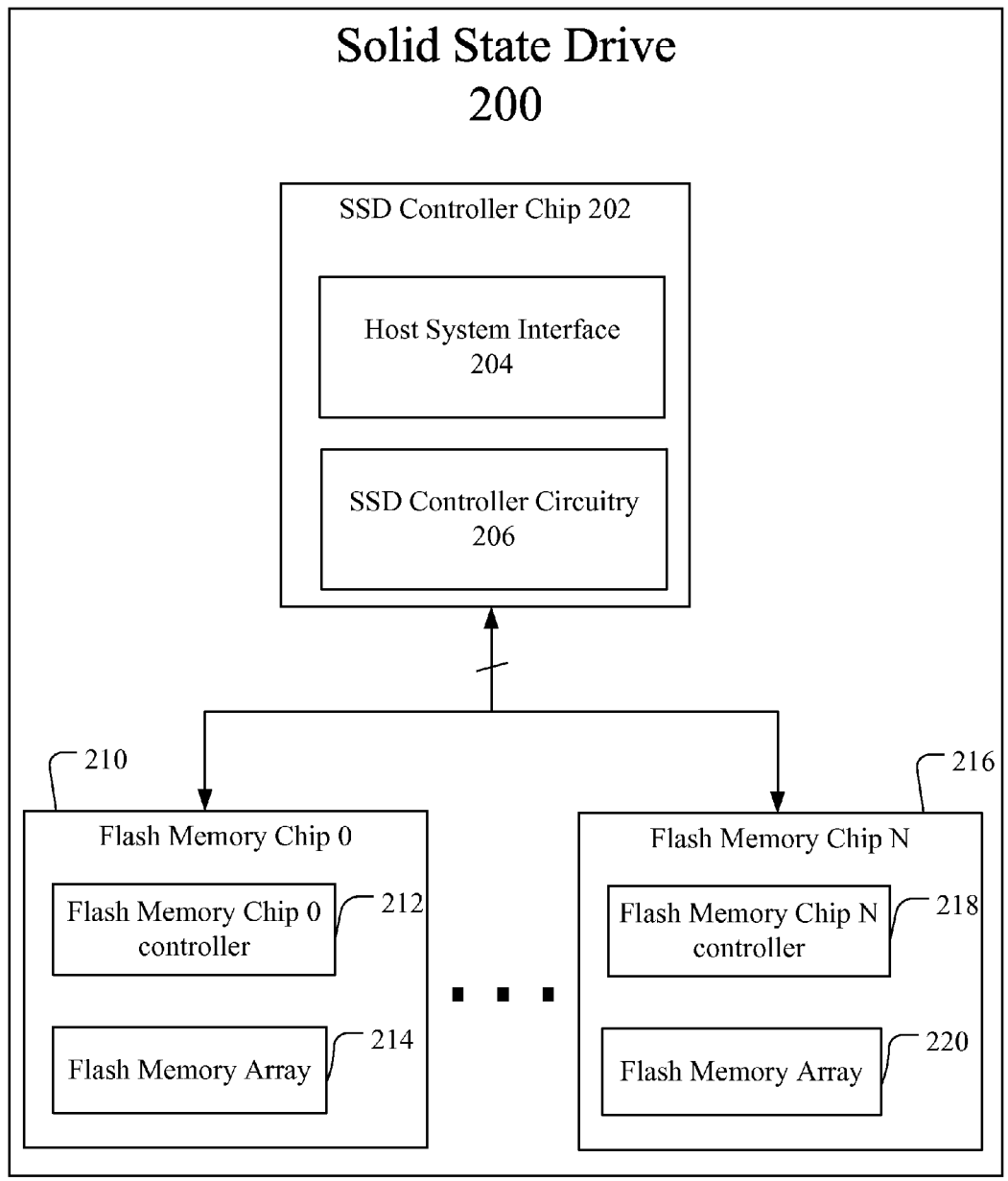
FIG. 2 illustrates a block diagram of an SSD.

As discussed above, one type of memory system 102 is an SSD. An example of a block diagram of an SSD 200 is illustrated in FIG. 2. An example of an SSD is disclosed in U.S. Patent Publication No. 2008/0113525, incorporated by reference herein in its entirety. SSD 200 includes SSD controller chip 202. As illustrated in FIG. 2, SSD controller chip 202 includes host system interface 202, which may comprise circuitry and/or software in order to communicate with the host system 100. Alternatively, host system interface 202 may be external to SSD controller chip 202. SSD controller chip 202 further includes SSD controller circuitry 206 that is configured to perform one or more functions, including any one, any combination, or all of the following: error correction; wear leveling; bad block mapping; read scrubbing and read disturb management; read and write caching; garbage collection; and encryption. As discussed in more detail below, in one embodiment, SSD controller chip 204 may include additional functionality. The additional functionality in SSD controller chip 204 may be to assist one, some, or all of the flash memory chips to perform mathematical computational functionality and/or logic functionality, such as by routing commands received from the host system to the flash memory chips in order for the flash memory chips to perform mathematical computational functionality and/or logic functionality. In an alternate embodiment, the additional functionality in SSD controller chip 204 may comprise mathematical computational functionality and/or logic functionality to perform functions in addition to those described above.

SSD 200 further includes one or more flash memory chips, such as flash memory chip 0 (210) to flash memory chip N (216). Flash memory chip 0 (210) may include flash memory chip 0 controller (212) and flash memory array 214. Likewise, flash memory chip N (216) may include flash memory chip N controller (218) and flash memory array 220. In one embodiment, the flash memory array 214 and 220 comprises flash memory cells (such as single level cells and/or multi-level cells). In an alternate embodiment, the flash memory array 214 and 220 consists of flash memory cells without any computational functionality. As discussed in more detail below, in one embodiment, one, some, or all of the flash memory chips, such as flash memory chip 0 (210) and flash memory chip N (216), may include mathematical computational functionality and/or logic functionality.

Figure 4A:
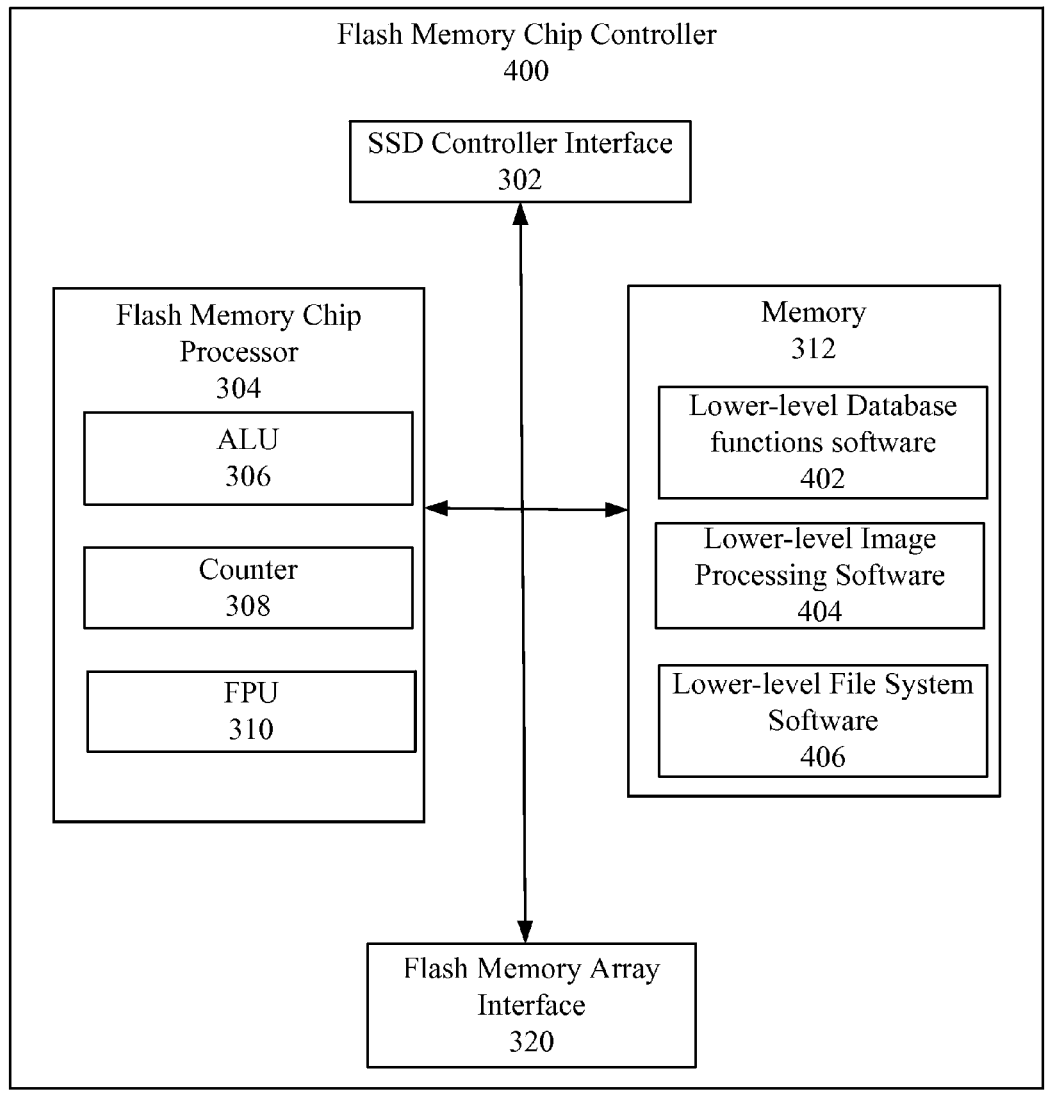
FIGS. 4A-B illustrates a second example of block diagrams of a flash memory chip controller and an SSD controller chip, respectively.
Figure 4B:
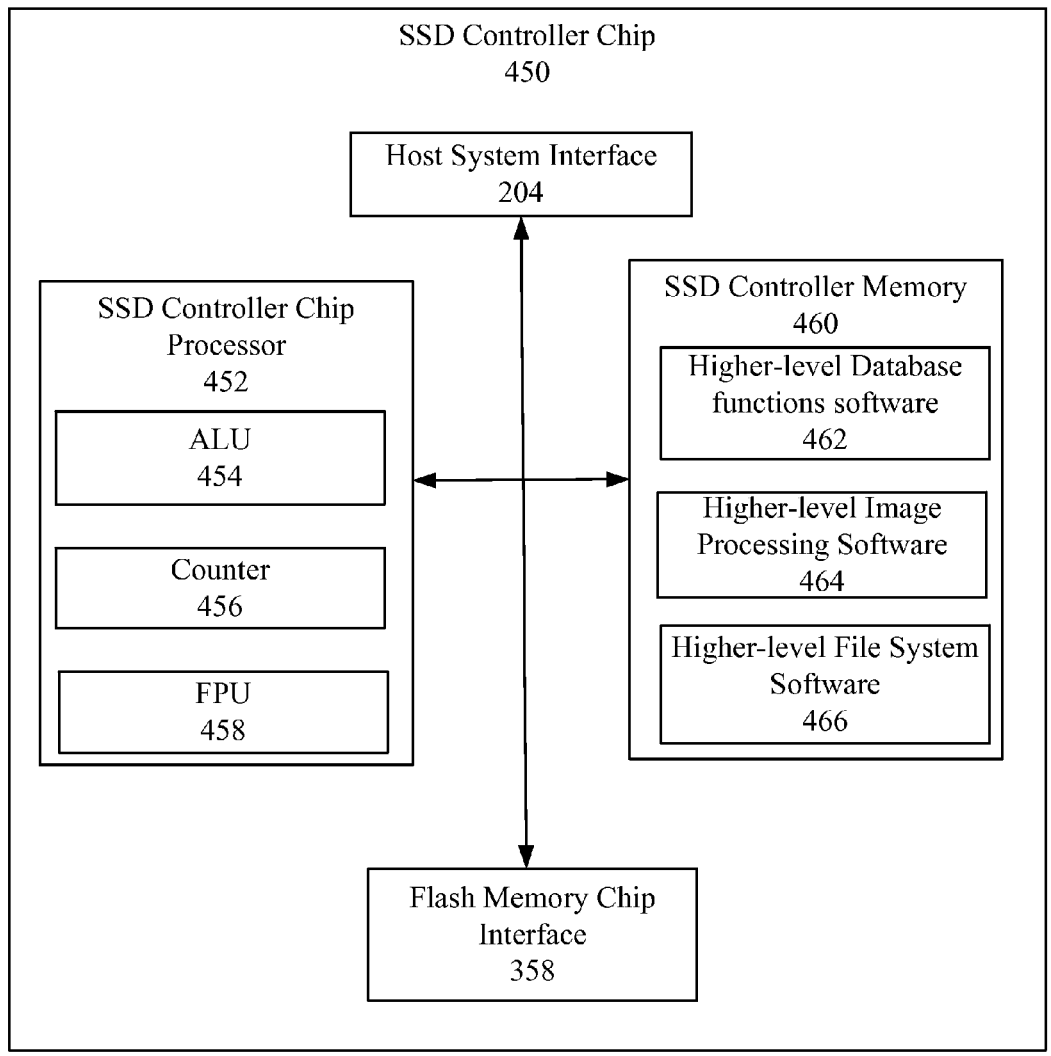
Figure 5:
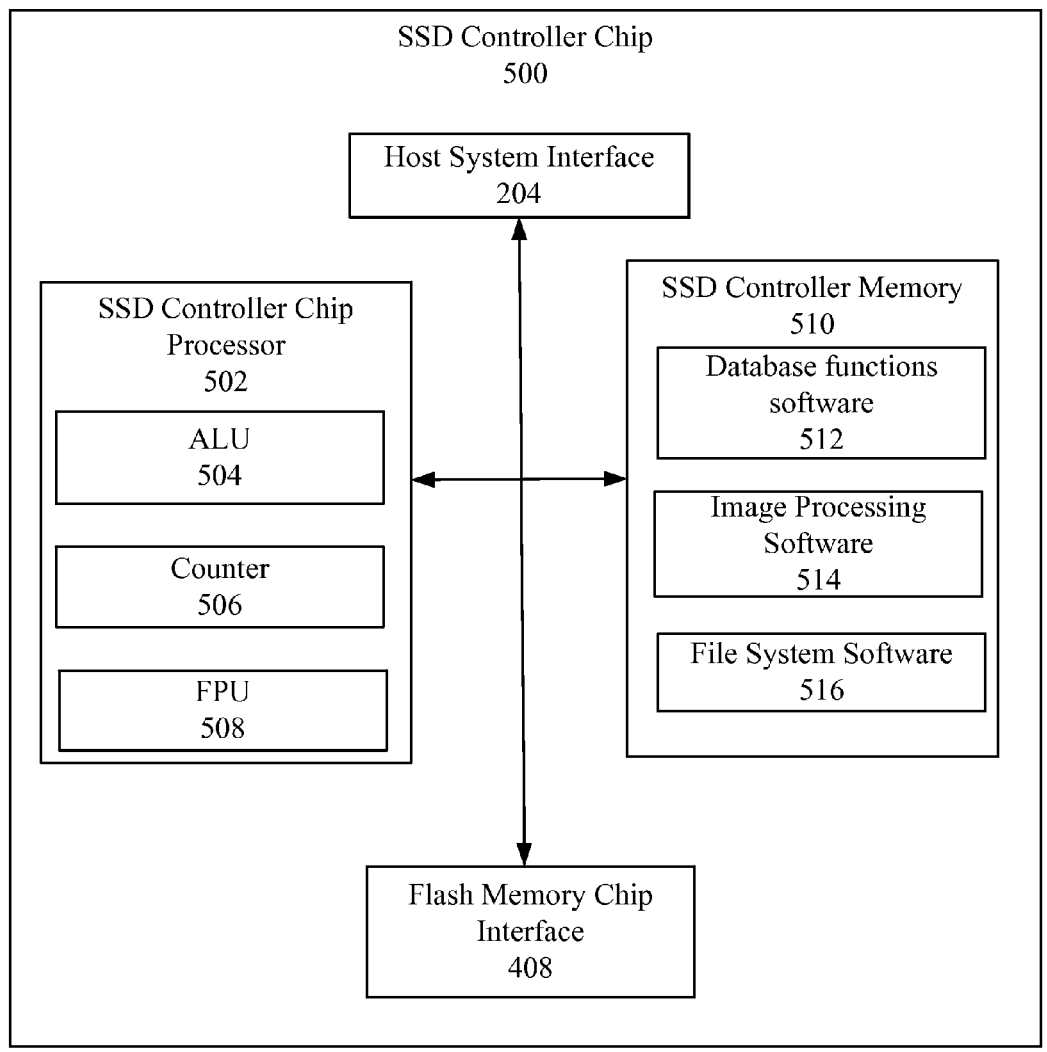
FIG. 5 illustrates a block diagram of third example of an SSD controller chip.

As discussed above, the mathematical computational functionality and/or logic functionality may reside in different parts of the storage device. As discussed in more detail below, FIGS. 3A-E illustrate that the mathematical computational functionality and/or logic functionality reside within the SSD only in the flash memory chip controller. FIGS. 4A-B illustrate that the mathematical computational functionality and/or logic functionality reside within the SSD in both the flash memory chip controller and the SSD controller chip. FIG. 5 illustrates that the mathematical computational functionality and/or logic functionality within the SSD only reside in the SSD controller chip. The examples of where the mathematical computational functionality and/or logic functionality may reside within the SSD are for illustration purposes. Other examples are contemplated.

Figure 3A:
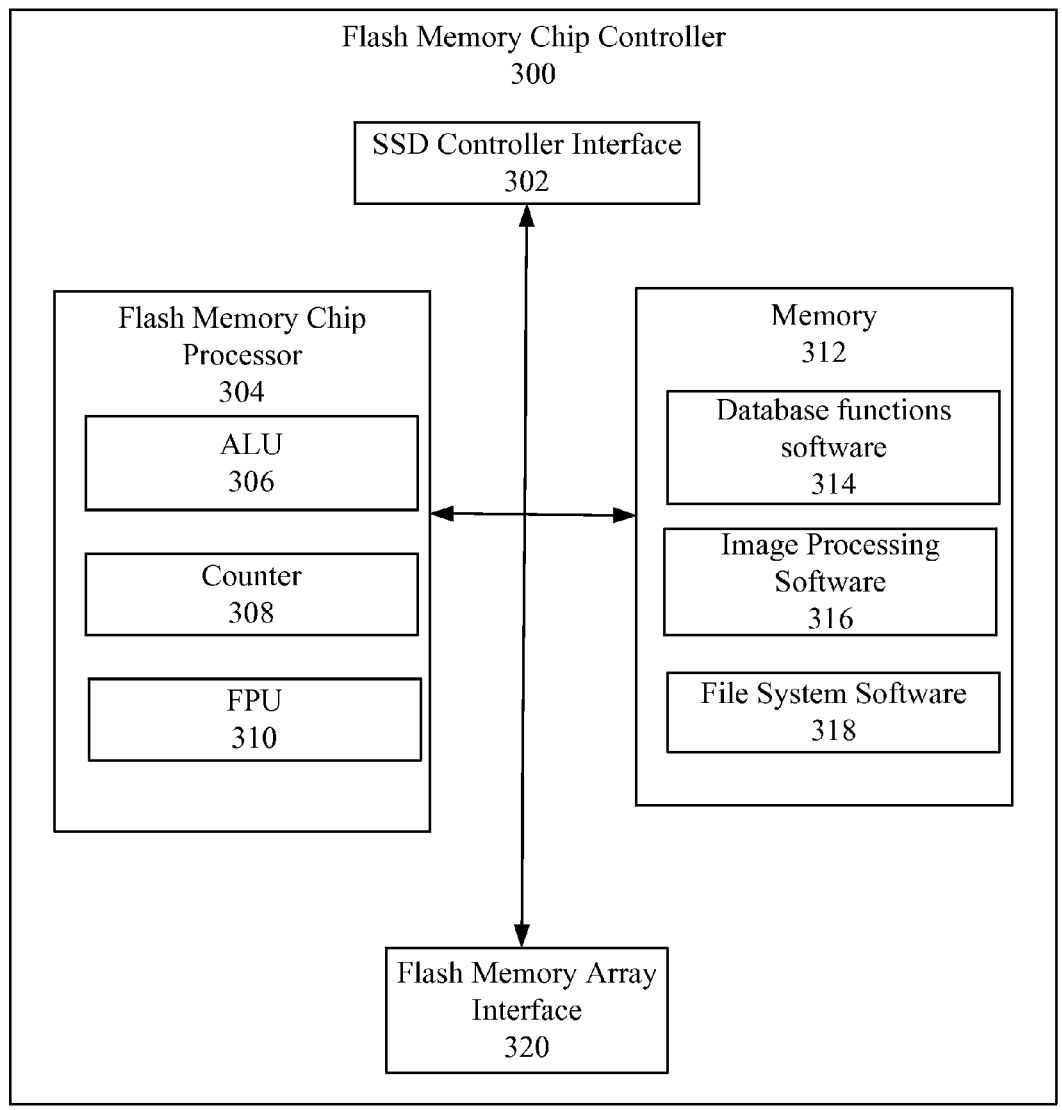
FIG. 3A illustrates a first example of a block diagram of a flash memory chip controller.

FIG. 3A is a block diagram of flash memory chip controller 300. As discussed above, a part of the flash memory chip, such as flash memory chip controller 300, may generally perform mathematical operations and elementary functions. The SSD controller chip 392 may assist the flash memory chip controller 300 to perform mathematical operations and elementary functions, as discussed below with respect to FIG. 3E.

The mathematical operations may include unary operations or binary operations. Unary operations involve only one value, such as negation and trigonometric functions. Binary operations take two values, and include, for example, addition, subtraction, multiplication, division, exponentiation, and remainder. In one embodiment, in addition to mathematical operations, the flash memory chip may perform one or more logical operations, as discussed in more detail below. In an alternate embodiment, instead of performing mathematical operations, the flash memory chip may perform one or more logical operations.

Flash memory chip controller 300 may comprise an expanded block diagram of flash memory chip 0 controller (212) or flash memory chip N controller (218) depicted in FIG. 2. Flash memory chip controller 300 includes SSD controller interface 302 for communicating, for example, with SSD controller chip 202.

Flash memory chip controller 300 further includes flash memory chip processor 304. Flash memory chip processor 304 may comprise a microprocessor, a microcontroller, an application specific integrated circuit (ASIC), a field programmable gate array, a logical digital circuit, or other now known or later developed logical processing capability. Flash memory chip processor 304 may include one or more processing capabilities, such as a comparator function. As illustrated in FIG. 3A, flash memory chip processor 304 includes different functionality, such as ALU 306, counter 308, and FPU 310.

In one embodiment, any one, any combination, or all of ALU 306, counter 308, and FPU 310 is present in flash memory chip processor 304. For example, ALU 306, without counter 308 and FPU 310, may be included in flash memory chip processor 304. As another example, ALU 306 and counter 308, without FPU 310, may be included in flash memory chip processor 304.

FIG. 3A further includes memory 312. Memory 312 may include volatile memory, such as random access memory (RAM), and/or non-volatile memory. Processor executable instructions, which may be executed by flash memory chip processor 304, may be stored in memory 312. Examples of processor executable instructions include database functions software 314, image processing software 316, and file system software 314. Discussed below are various functions, including file system functions, image processing functions, and database functions, which may be implemented using database functions software 314, image processing software 316, and file system software 314, respectively.

FIG. 3A depicts that memory 312 is included as part of flash memory chip controller 300. In this regard, memory 312 may be dedicated to operations of flash memory chip controller 300. Alternatively, memory 312 may be part of flash memory (such as flash memory array 214 or flash memory array 220). Thus, flash memory chip controller 300 may dynamically assign a part of flash memory (such as flash memory array 214 or flash memory array 220) for operations related to flash memory chip controller 300, such as memory used for mathematical computational functionality and logic functionality, or assign the part of flash memory for data storage. In still an alternate embodiment, memory 312 may include a part that is dedicated for operations of flash memory chip controller 300, such as memory for storing software for execution by flash memory chip controller 300, and a part that is dynamically assigned.

FIG. 3A shows several examples of the mathematical computational functionality and logic functionality, including ALU 306, counter 308, and FPU 310, as being a part of the flash memory chip controller 300. In one embodiment, ALU 306, as depicted in FIG. 3A, is included as part of flash memory chip processor 304. For example, ALU 306 may be part of the flash memory chip processor 304, wherein flash memory chip processor 304 may execute different software (which may be stored in memory 312) in order to perform the functionality of ALU 306. In an alternate embodiment, ALU 306 may be an electronic component separate from and in communication with flash memory chip processor 304. In either embodiment, the ALU may be included and reside in the flash memory chip controller. Inputs and outputs may flow along an electronic path, such as a bus.

As discussed above, ALU 306 may perform various operations, such as logical operations (e.g., any one, any combination, or all of the following: AND, OR, NOT, XOR, NOR, NAND); bit-shifting operations (e.g., shifting the positions of the bits by a certain number of places to the right or left, which may be considered a multiplication operation); and arithmetic operations (e.g., addition and subtraction).

In one embodiment, ALU 306 may be divided into two units, including an arithmetic unit (AU) and a logic unit (LU). In an alternate embodiment, ALU 306 is composed of a single unit. Further, flash memory chip controller 300 may include one or more ALUs. For example, in one embodiment, flash memory chip processor 304 may include a single ALU. In an alternate embodiment, the flash memory chip processor 304 may include multiple ALUs.

The input to the ALU may comprise an instruction word (e.g., a machine instruction word) that contains an operation code (e.g., an "op code"), one or more operands, and potentially a format code. As discussed in more detail below, the ALU may receive various commands. The commands may be sent from the host system via the SSD controller. In response to receiving the command, the flash memory chip controller may determine to perform one or more mathematical and/or logic operations. As discussed above, the one or more mathematical and/or logic operations are performed for the purpose of carrying out functions, such as image processing, database functions, and file system functions. In this regard, the command may be indicative of a database command, an image processing command, or a file system command. Other commands are contemplated. Thus, different instruction words may be used for the various operations.

The command may include an operation code. The operation code may indicate to the ALU what function to perform and the operands to use in the operation. For example, two operands may be added together or compared logically. The output may comprise a result that is placed in a part of flash memory, such as part of flash memory designated as a storage register and settings that indicate whether the function was performed successfully.

As discussed above, memory in the flash memory chip may be used for ALU operations including storage places for input operands, operands that are being added, the accumulated result (stored in an accumulator), and shifted results. In the embodiment where flash memory chip controller 300 includes a dedicated ALU, the flow of bits and the operations performed on them in the subunits of the ALU may be controlled by gated circuits. The gates in these circuits may be controlled by a sequence logic unit that uses a particular algorithm or sequence for each operation code. In the arithmetic unit, multiplication may be performed by a series of adding or subtracting and shifting operations. Further, negative numbers may be represented in the ALU in several ways. In the logic unit, one of a plurality of possible logic operations may be performed, such as comparing two operands and identifying where bits do not match.

Counter 308 may further be used in order to perform various functions, such as file system functions, image processing functions, and database functions. Counter 308 may be implemented using register-type circuits, such as a flip-flop. Different counters may be used including, but not limited to: asynchronous counter; synchronous counter; decade counter; up/down counter (which counts both up and down under command of a control input); ring counter; Johnson counter; etc. Similar to ALU, counter 308 may be embodied in dedicated hardware (such as flip-flops) or may be embodied in software executed on flash memory chip processor 304.

FPU 310 is configured to carry out operations, such as mathematical operations, on floating point numbers. Mathematical operations include, but are not limited to, division, square root, bitshifting, and transcendental functions (such as exponential or trigonometric calculations). Similar to ALU 306, FPU 310, as depicted in FIG. 3A, is included as part of flash memory chip processor 304. Thus, FPU 310 may be part of the flash memory chip processor 304, wherein flash memory chip processor 304 may execute different software (which may be stored in memory 312) in order to perform the functionality of FPU 310. In an alternate embodiment, FPU 310 may be an electronic component separate from and in communication with flash memory chip processor 304. Inputs and outputs may flow along an electronic path, such as a bus. Graphics applications, which is an example of image processing discussed below, may use FPU 310.

The mathematical computational functionality and logic functionality embodied in the flash memory chip controller 300 enables the flash memory chip controller 300 to perform a variety of functions. Examples of functions include, but are not limited to: database functions, image processing functions, and file system functions. As shown in FIG. 3A, flash memory chip controller 300 may perform database functions, image processing functions, and file system functions by using database functions software 314, image processing software 316, and file system software 314, respectively.

For example, the mathematical computational functionality and logic functionality (such as ALU 306) embodied in the flash memory chip controller 300 may be used with the comparator in the flash memory chip processor 304. In one implementation, a pattern stored within the flash memory chip, such as stored at the data cache of flash memory and a page is read and comparison is done using the comparator.

One application, discussed below in more detail, is to load one or more pages into a cache, such as a dynamic data cache (DDC) and perform mathematical and/or logic functionality on part or all of the loaded pages. For example, plane1 may be loaded into dynamic data cache 1 (DDC1) and plane 2 may be loaded into dynamic data cache 2 (DDC2). DDC1 and DDC2 may be considered operand registers, which may feed into an ALU. The ALU perform one or more operations, such as +, sign, *, shift, and other operations. The result of performing the ALU operation on the operand registers may be routed to a data cache. The data in the data cache may then be copied onto the flash memory chip to another plane. In this regard, data on plane1 and plane2 may be algebraically manipulated and the result is stored in plane3. All these operations may be done within the flash memory chip without moving the data outside of the flash memory chip, and may be done in a page wide format.

The results of the mathematical and/or logic functionality may be stored within the flash memory chip. In one embodiment, the flash memory chip may have a dedicate memory for storing the results. In an alternate embodiment, the flash memory chip may not have a dedicated memory space for storing the results, and may dynamically assign an area for storing the results. In this regard, the flash memory chip controller 300 may partition a part of memory within the flash memory chip, such as in flash memory (e.g., within flash memory array 214 or flash memory array 220) in order to have an input bank and an output bank. In an embodiment, the computed results may be stored in hybrid memory, such as mixing NAND flash memory with phase change memory (PCM). Alternatively, the computed results may be stored solely in NAND flash memory.

Database Functions

Part of the flash memory chip, such as flash memory chip controller 300, may perform one or more database functions in order to manage data stored in the flash memory. For example, flash memory chip 0 controller 212 may manage data stored in flash memory array 214 stored on flash memory chip 0 (210). Alternatively, flash memory chip 0 controller 212 may manage data stored in flash memory on stored on different chip, such as flash memory array 220 stored on flash memory chip N (216).

In this regard, the flash memory chip controller 300 may perform a variety of database functions, such as: schema search; insertion; deletion; append; and other database functions. As discussed below, the entire database, data and functions, may be stored on the flash memory chip. In this regard, each of the flash memory chips may do the actual searching, as opposed to being done at the host level.

Management of data may involve both defining structures for storing information and providing mechanisms for manipulating the information. For example, the management of the data may provide users with an abstract view of the data. That is, the database system may hide certain details of how the data are stored and maintained. Thereby, data may be stored in complex data structures that permit efficient retrieval, yet users may see a simplified and easy-to-use view of the data. In order to accomplish this, different levels of abstraction may be used. For example, the lowest level of abstraction may be the physical level and may describe how the data are actually stored and details the data structures. The next-higher level of abstraction may be the logical level and may describe what data are stored, and what relationships exist among those data. The highest level of abstraction may be the view level and may describe parts of the database that are relevant to each user; application programs used to access a database may, for example, form part of the view level.

The overall structure of the database may be referred to as the database schema. The schema may specify data, data relationships, data semantics, and consistency constraints on the data. Underlying the structure of a database is the logical data model, which may comprise a collection of conceptual tools for describing the schema.

One type of data model is the entity-relationship data model, which is based on a collection of basic objects, called entities, and of relationships among these objects. An entity is a "thing" or "object" in the real world that is distinguishable from other objects. A relationship is an association among several entities. Other types of models include, without limitation, the object-oriented model, the record-based model, and the relational model.

Logically, data in a relational database may be organized as a set of relations, with each relation consisting of a set of records. This is the view given to database users. The underlying implementation on the memory device, such as the SSD, may be hidden from the user and may comprise a set of files. Each file comprises of a set of fixed-size pieces of disk storage, called blocks. Records of a relation are stored within blocks. Each relation may be associated with one or more files. Generally a file contains records from only one relation, but organizations where a file contains records from more than one relation are also used for performance reasons.

One way to retrieve a desired record in a relational database is to perform a scan on the corresponding relation; a scan fetches all the records from the relation, one at a time. As discussed above, in one embodiment, the SSD is composed of multiple flash memory chips, such as flash memory chip 0 (210) and flash memory chip N (216). The host system 100 may send a command to the SSD 200 to perform a scan. The scan may be for all data stored within the SSD 200, or may be for a subset of data stored within the SSD 200 (such as one or more LBA ranges). As discussed in more detail below, the SSD controller chip 202 may determine which flash memory chip(s) to send the command to. In the example where the scan is for all data stored within the SSD 200, the SSD controller chip 202 may send the command to each of the flash memory chips for processing. In the example where the scan is for a subset of data stored within the SSD 200, the SSD controller chip 202 may first determine which flash memory chips have the subset of data stored therein (e.g., determine based on the one or more LBA ranges, what are the physical locations at which the data is stored) and send the command to only the flash memory chips determined to store the subset of data.

Ordinarily, accessing desired records from a large relation using a scan on the relation may be very time-consuming. However, because the scans may be performed at the flash memory chip level, data subject to the scan need not be sent off chip, such as outside of the flash memory chip. In this regard, performing the database functions within the SSD, such as within the flash memory chip, may be faster than performing the function on the host system.

There may be several examples of data manipulation, such as, without limitation, retrieval, insertion, deletion, and modification of information stored in the database. A data-manipulation language enables users to access or manipulate data as organized by the appropriate data model. Examples of data-manipulation languages include, without limitation, procedural data-manipulation languages and nonprocedural data-manipulation languages.

One type of database function may comprise a database query. A database query may comprise a command that is sent to the flash memory chip requesting the retrieval of information from the flash memory chip. As discussed in more detail below, in response to the database query, the flash memory chip may use the ALU in order to search the flash memory in the flash memory chip in order to generate one or more results. The database query thus may be used as the way of retrieving information from the flash memory within the flash memory chip.

One or more database languages may be used for the database commands. More specifically, database languages may support both data-definition and data-manipulation functions. One type of database language is SQL (structured query language), although other database languages are contemplated. SQL comprises a data definition language and a data manipulation language. The scope of SQL includes, for example, data insert, query, update and delete, schema creation and modification, and data access control.

SQL may use one or more operators in a command. The following is a table of examples of operators:

| Operator | Description | Example |
| --- | --- | --- |
| = | Equal to | Author = 'Alcott' |
| <> | Not equal to | Dept <> 'Sales' |
| > | Greater than | Hire_Date > '2012-01-31' |
| < | Less than | Bonus < 50000.00 |
| >= | Greater than or equal | Dependents >= 2 |
| <= | Less than or equal | Rate <= 0.05 |
| BETWEEN | Between an inclusive range | Cost BETWEEN 100.00 AND 500.00 |
| LIKE | Match a character pattern | First_Name LIKE 'Will%' |
| IN | Equal to one of multiple possible values | DeptCode IN (101, 103, 209) |
| IS or IS NOT | Compare to null (missing data) | Address IS NOT NULL |

Any one, any combination, or all of the example operators above may be used. Further, other operators are contemplated. The database command may be parsed by the flash memory chip processor 304 for the operator. After which, the ALU 306 may be used in order to implement the operator. For example, the database command may include the "BETWEEN" operator. The ALU 306 may be used to determine whether data stored in the flash memory satisfies the "BETWEEN" command.

As discussed above, the command may comprise a database query. In SQL, the database query may be performed with the declarative SELECT statement. SELECT retrieves data from one or more tables, or expressions. Standard SELECT statements have no persistent effects on the database. Some non-standard implementations of SELECT can have persistent effects, such as the SELECT INTO syntax that exists in some databases.

A query may include a list of columns to be included in the final result immediately following the SELECT keyword. An asterisk ("*") may also be used to specify that the query should return all columns of the queried tables. SELECT is one statement in SQL, with optional keywords and clauses that include: the FROM clause, which indicates the table(s) from which data is to be retrieved; the WHERE clause, which includes a comparison predicate, which restricts the rows returned by the query; the GROUP BY clause, which is used to project rows having common values into a smaller set of rows; the HAVING clause, which includes a predicate used to filter rows resulting from the GROUP BY clause; and the ORDER BY clause, which identifies which columns are used to sort the resulting data, and in which direction they should be sorted (options are ascending or descending).

As discussed above, SQL may include a Data Manipulation Language (DML). DML may be used to add, update and delete data. For example, INSERT adds rows to an existing table, UPDATE modifies a set of existing table rows, DELETE removes existing rows from a table, and MERGE is used to combine the data of multiple tables. Further, SQL may include a Data Definition Language (DDL), which manages table and index structure. Example items of DDL include the following statements: CREATE (which creates an object (a table, for example) in the database), ALTER (which modifies the structure of an existing object in various ways, for example, adding a column to an existing table or a constraint, RENAME, DROP (which deletes an object in the database) and TRUNCATE (which deletes all data from a table in a very fast way, deleting the data inside the table and not the table itself).

Image Processing

Part of the flash memory chip, such as flash memory chip controller 300, may perform one or more image processing functions on data stored in the flash memory. Image processing, such as video processing, is time-consuming partly due to the large amount of data to be transferred into and out of the flash memory chip. Instead, in-place processing within the flash memory chip alleviates this problem.

Image processing may comprise any form of signal processing on an image. Different types of image processing are contemplated. One type comprises performing one or more operations on an input image, such as a photograph or video frame, in order to generate an output that is either an image or a set of characteristics or parameters related to the image. Image processing may result in image enhancement (e.g., accentuation, or sharpening, of image features such as boundaries, or contrast to make a graphic display more useful for display & analysis); image restoration (e.g., filtering the observed image to minimize the effect of degradations); or image compression (e.g., minimizing the number of bits required to represent an image).

As discussed below, the flash memory chip may receive a command from SSD controller chip 202 to perform image processing. The command may originate from host system 100. In response, the flash memory chip, such as flash memory chip processor 304 executing image processing software 316, may perform the image processing and send the results via the SSD controller interface 302 to SSD controller chip 202.

File System Functions

The file system is used in order to control how information is stored or retrieved, such as stored or retrieved from SDD 200. More specifically, the structure and logic rules used to manage the groups of information and their names may be described as a "file system". A file system may be viewed as an index or database containing the physical location of every piece of data on a hard drive. Examples of file systems include, without limitation, File Allocation Table (FAT) and New Technology File System (NTFS).

Typically, the file system resides on the host system and file system operations are performed by the host system. In one embodiment, one, some, or all file system operations may be performed by the SSD, such as the flash memory chip processor 304 on the flash memory chip controller 300. As discussed in more detail below, the flash memory chip processor 304 may receive a file system command from the host system (relayed via the SSD controller chip 202), parse the file system command, and perform the file system command.

File system commands comprise utilities which enable management of files that are stored or created. File system commands may be segmented into different levels, such as lower levels of file system commands (e.g., linking sectors together to form a logical unit) and higher levels of file system commands (e.g., user commands such as creating a directory, moving a file, etc.). Higher level file system commands may be composed of multiple lower level commands. For example, a command to create a file of a certain size may be composed of multiple lower level commands, such as finding free blocks and linking them together to form the capacity in order to make it appear to the user that the blocks are a contiguous logical unit to the user.

Examples of file system commands include, but are not limited to: copying a file (e.g., cp in Unix); moving a file (e.g., mv in Unix); removing a file (e.g., rm in Unix); removing a directory (e.g., rmdir in Unix); making a directory (e.g., mkdir in Unix); renaming a file (e.g., mv in Unix); etc.

In one embodiment, a part of flash memory chip controller 300, such as the flash memory chip processor 304, is configured to perform operations responsive to all file system commands. In an alternate embodiment, a part of flash memory chip controller 300, such as the flash memory chip processor 304, is configured to perform operations responsive to a subset (or less than all) of file system commands. For example, the flash memory chip processor 304 may be configured to perform only lower level file system commands.

Figure 3B:
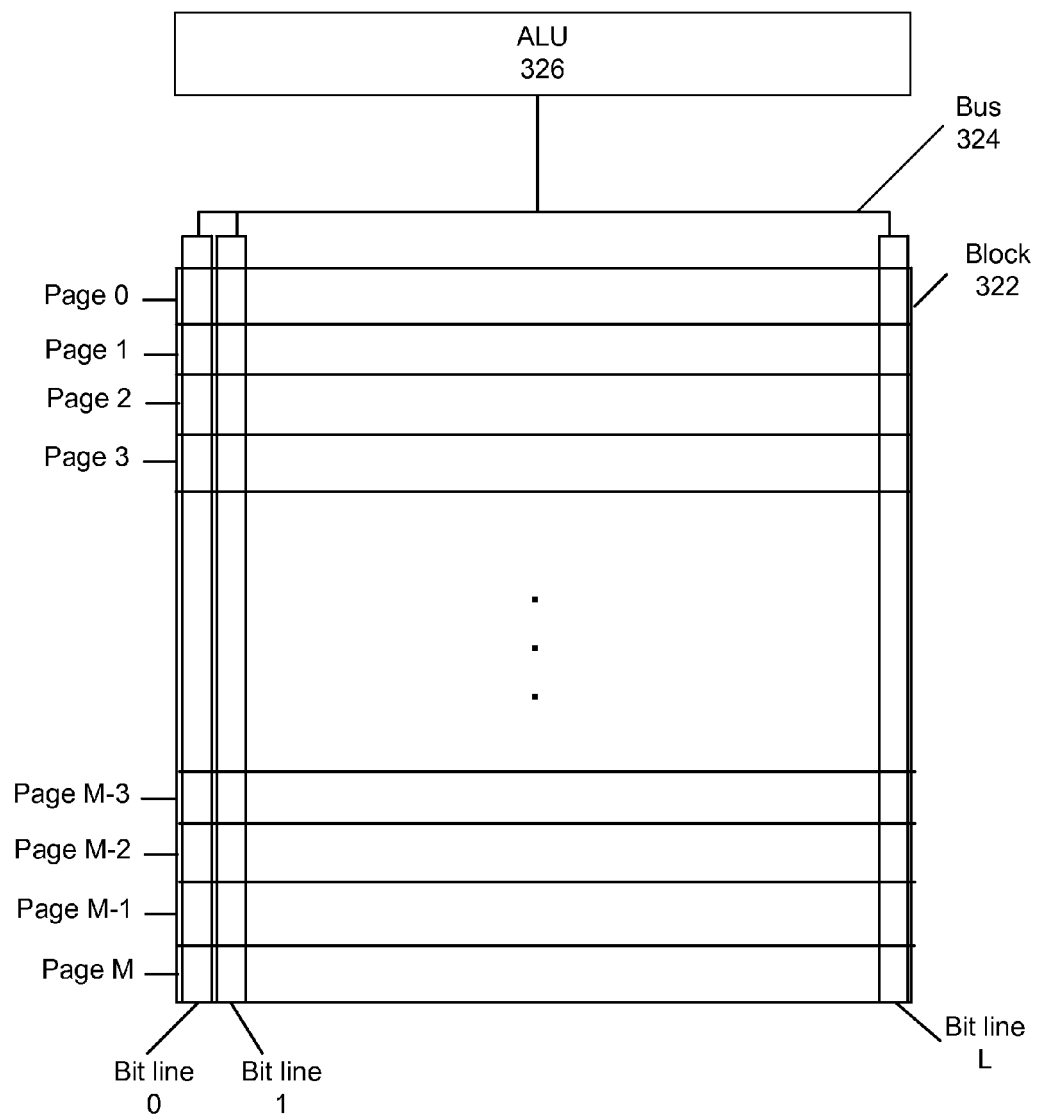
FIGS. 3B-C illustrate examples of block diagrams of one or more ALUs assigned to a block in the flash memory array.
Figure 3C:
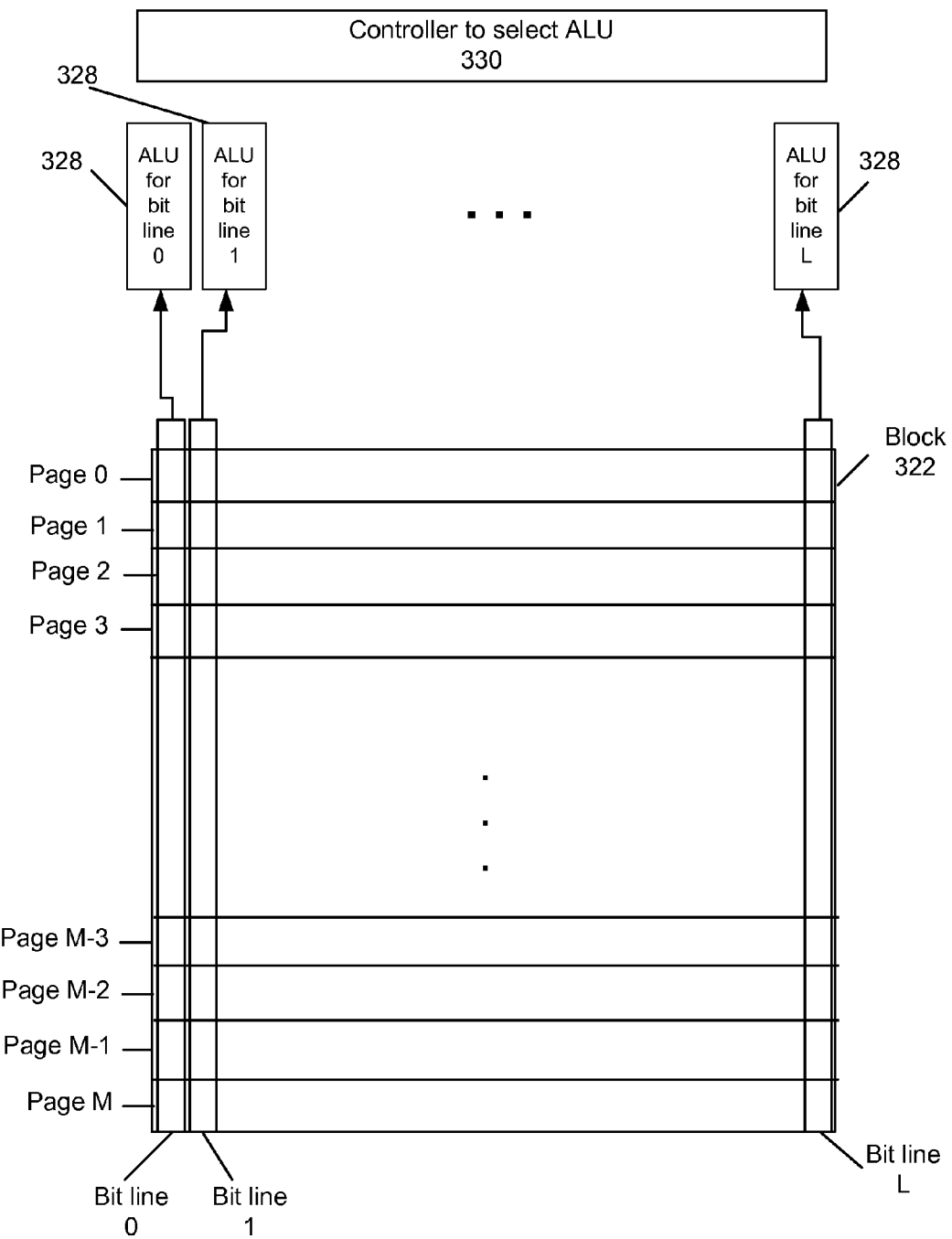
Figure 3D:
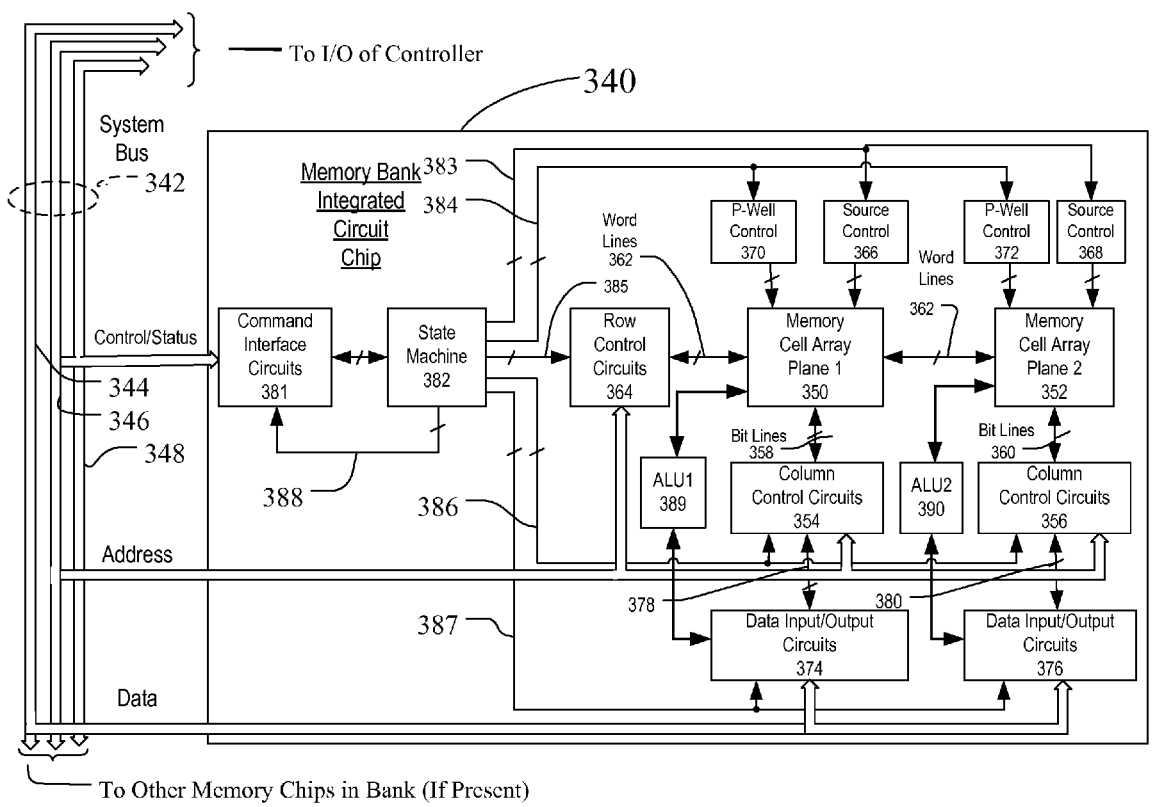
FIG. 3D is an example ALUs assigned to flash memory banks.

As discussed above, one or more ALUs may be found in in the flash memory chip controller 300. Further, the one or more ALUs may be situated in different places within memory chip controller 300. FIGS. 3B-D illustrate some examples of configurations of ALUs within memory chip controller 300. In one embodiment, a single ALU may be present in the flash memory chip controller 300. In an alternate embodiment, multiple ALUs may be present in the flash memory chip controller 300.

The number of ALUs in the flash memory chip controller 300 may be dependent on the flash memory array, such as flash memory array 214 or 220, illustrated in FIG. 2. In one embodiment, an ALU may be assigned to one, some, or each of the blocks in the flash memory array. In an alternate embodiment, an ALU may be assigned to a sub-block construct. For example, an ALU may be assigned to one, some, or each bit line in the flash memory array. In still an alternate embodiment, an ALU may be assigned to one, some, or each plane in the flash memory array. In this regard, an ALU may be assigned to different subdivisions or partitions of the memory cell array.

FIG. 3B is one illustration of a block 322 in the flash memory array. Examples of flash memory array include flash memory array 214 and 220, discussed above. The flash memory array may be composed of multiple blocks. Each block in the flash memory array may be composed of pages. FIG. 3B illustrates page 0 to page M. Data may be read from the block 322 using bit lines, such as bit line 0 to bit line L illustrated in FIG. 3B. The bit lines may be electrically connected to bus 324, which is electrically connected to ALU 326. As discussed above, ALU, such as ALU 326, may include mathematical and/or logical functionality. As merely one example, ALU 326 may include one or more registers and may include any one, any combination, or all of the following functionality: to determine whether two items of data (such as first data loaded into a first register and second data loaded into a second register) are equal or whether one item of data is greater than or less than another item of data; and to perform addition or subtraction; to shift bits in a register left or right. As shown in FIG. 3B, ALU 326 is associated with block 322. In this regard, a respective ALU may be assigned to respective block in the flash memory array. In this regard, a flash memory array with, for example, 1000 blocks, may include 1000 ALUs, with each ALU assigned to a respective block. Further, assigning an ALU at the block level readily enables scalability of the processing within the flash memory array.

FIG. 3C is another illustration of a block 322 in the flash memory array. As discussed above, an ALU may be assigned to one, some, or each bit line in a block. As shown in FIG. 3C, ALU 328 is assigned to each of the bit lines in block 322, such as bit line 0 to bit line L. In this regard, there are L+1 ALUs 328 assigned to each block. A controller may be used in order to select a specific ALU for processing. As shown in FIG. 3C, controller to select ALU 330 is used. Controller 330 may be a part of flash memory chip controller 300. The arrangement illustrated in FIG. 3C may be used for a single block in the flash memory array of the flash memory chip, multiple blocks in the flash memory array of the flash memory chip, or each of the blocks in the flash memory array of the flash memory chip. In the example discussed above in which the flash memory array includes 1000 blocks, the number of ALUs may comprise 1000*(L+1).

FIG. 3D is an example one flash memory bank suitable as one of the flash memory banks. A bank in the multi-bank flash memory may comprise one or more integrated circuit chips, where each chip may contain an array of memory cells organized into multiple planes. An illustration of a memory bank 340 on a single chip is shown in FIG. 3D. The memory bank 340 of FIG. 3D shows such planes 350 and 352 for simplicity but a greater number of planes, such as four or eight planes, may instead be used. Alternatively, the memory cell array of a memory bank may not be divided into planes. When so divided, however, each plane has its own column control circuits 354 and 356 that are operable independently of each other. The circuits 354 and 356 receive addresses of their respective memory cell array from the address portion 346 of the system bus 342, and decode them to address a specific one or more of respective bit lines 358 and 360. The wordlines 362 are addressed through row control circuits 364 in response to addresses received on the address bus. Source voltage control circuits 366 and 368 are also connected with the respective planes, as are p-well voltage control circuits 370 and 372. If the bank 340 is in the form of a memory chip with a single array of memory cells, and if two or more such chips exist in the memory system, the array of each chip may be operated similarly to a plane within the multi-plane chip described above.

Data are transferred into and out of the planes 350 and 352 through respective data input/output circuits 374 and 376 that are connected with the data portion 344 of the system bus 342. The circuits 374 and 376 provide for both programming data into the memory cells and for reading data from the memory cells of their respective planes, through lines 378 and 380 connected to the planes through respective column control circuits 354 and 356.

Each memory chip in each bank contains some controlling circuitry that executes commands from the processor, such as flash memory chip processor 304, to perform such functions. Interface circuits 381 are connected to the control and status portion 348 of the system bus 342. Commands from the processor, such as flash memory chip processor 304, are provided to a state machine 382 that then provides specific control of other circuits in order to execute these commands. Control lines 383-387 connect the state machine 382 with these other circuits as shown in FIG. 3D. Status information from the state machine 382 is communicated over lines 388 to the interface 381 for transmission to the processor, such as flash memory chip processor 304, over the bus portion 348. The memory cell arrays 350 and 352 may be composed of NAND architecture, although other non-volatile memory architectures or technologies, alone or combination, such as NOR, can be used instead.

As illustrated in FIG. 3D, an ALU may be assigned to each plane in the memory cell array, such as ALU1 (389) assigned to plane 350 and ALU2 (390) assigned to plane 352. Each ALU may be electrically connected to respective input/output circuits, such as input/output circuits 374 and 376. In this regard, an ALU may be assigned to a respective plane in the memory cell array, and may be in communication with a respective input/output circuit in order to control the respective ALU.

Figure 3E:
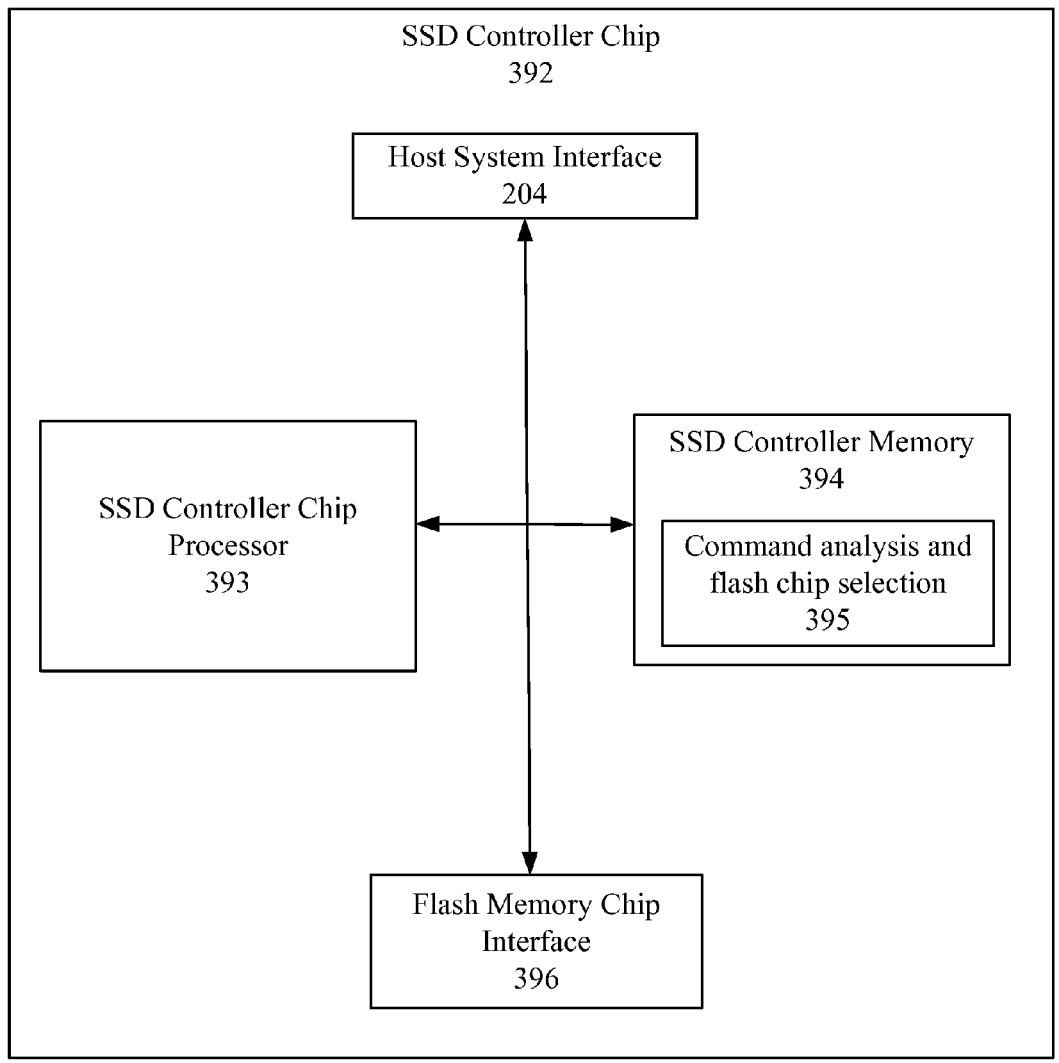
FIG. 3E illustrates a first example of a block diagram of an SSD controller chip.

FIG. 3E illustrates a block diagram of one example of an SSD controller chip, illustrated as SSD controller chip 392. As discussed above, the SSD may include one or more controller chips in order to communicate with the host system on one side and communicate with the flash memory chips resident in the SSD on the other side. SSD controller chip 392 includes a host system interface 204, discussed above with respect to FIG. 2. SSD controller chip 392 further includes SSD controller chip processor 393, SSD controller memory 394 and flash memory chip interface 396. SSD controller memory 394 may include one or more software programs or code for execution by SSD controller chip processor 393.

As discussed above, in one embodiment, SSD controller chip 392 is configured to assist the flash memory chip controller, such as illustrated in FIG. 3A, to perform mathematical and/or logical computations. In this regard, SSD controller memory 394 includes software for command analysis and flash chip selection 395. When SSD controller chip processor 393 executes the software for command analysis and flash chip selection 395, the SSD controller chip 392 may further be configured to analyze commands received from the host system and send the commands to one or more of the flash memory chips. As discussed in more detail below, the SSD controller chip processor 393 may parse the command, determine one or more LBA ranges within the command, determine which flash memory chips store data within the LBA ranges in the command, and forward the command to the flash memory chips.

As discussed above, multiple devices within the SSD may include mathematical computational functionality and/or logic functionality. FIGS. 4A-B shows examples of the mathematical computational functionality and/or logic functionality in the flash memory chip controller 400 and the SSD controller chip, respectively. For example, flash memory chip controller 400 may include ALU 306, counter 308, and FPU 310, as discussed above with respect to FIG. 3A. Likewise, flash memory chip controller may include memory 312. Memory 312 may include software related to database operations, image processing, and file system operations. As another example, SSD controller chip 450 may include ALU 454, counter 456, and FPU 458 resident in SSD controller chip processor 452. ALU 454, counter 456, and FPU 458 may be similar to ALU 304, counter 308, and FPU 310, respectively, discussed above.

In one implementation, a plurality of functions may be performed. For example, database functions may include a set of database functions, image processing functions may include a set of image processing functions, and file system functions may include a set of file system functions. The set of functions may be divided so that a first set of functions may be performed by the SSD controller chip 450 and a second set of functions may be performed by the flash memory chip controller 400.

In one embodiment, higher-level functions (or more complex functions) may be performed by SSD controller chip 450 and lower-level functions (or less complex functions) may be performed by the flash memory chip controller 400. For example, flash memory chip processor 304 may access lower-level database functions software 402, lower-level image processing software 404, or lower-level file system software 406 in order to perform lower-level functions for database functions, image processing, or file system functions, respectively. As another example, SSD controller chip processor 452 may access higher-level database functions software 462, higher-level image processing software 464, or higher-level file system software 466 in SSD controller memory 460 in order to perform higher-level functions for database operations, image processing, or file system operations, respectively. As discussed above, in order to perform one, some, or all of the functions in the set of functions (such as the set of database functions, image processing functions and file system functions), a part of the SSD, such as flash memory chip processor 304 or SSD controller chip processor 452, may use mathematical and/or logical operations, such as by using ALU, counter, and/or FPU.

In operation, SSD controller chip 450 and flash memory chip controller 400 may operate in a master-slave arrangement in which SSD controller chip 450 commands flash memory chip controller 400 to perform one or more actions, such as to perform lower-level database functions, lower-level image processing functions, or lower-level file system functions, as discussed above. In one example, SSD controller chip 450 may receive a communication from the host device (such as receiving a command from host system 100). In response to receiving the communication (such as receiving a command), SSD controller chip 450 may determine the function(s), such as lower-level or higher-level functions, responsive to the command. SSD controller chip 450 may determine which functions are to be performed by SSD controller chip 450 and which functions are to be performed by flash memory chip controller 400. As one example, a command may comprise a database command. SSD controller chip 450, such as SSD controller chip processor 452, may analyze the database command and determine: (i) one or more higher-level database functions are to be performed in response to receiving the database command; (ii) one or more lower-level database functions are to be performed in response to receiving the database command; or (iii) one or more higher-level database functions and one or more lower-level database functions are to be performed in response to receiving the database command. In (i), SSD controller chip processor 452 may perform all of the higher-level database functions. For example, SSD controller chip processor 452 may determine, for a specific higher-level database function, the mathematical and/or logical operations necessary in order to perform the specific higher-level database function. In (ii), SSD controller chip processor 452, responsive to determining a lower-level function needs to be performed, determine which flash memory chips need to perform the lower-level function, and then send a command to the determined flash memory chips instructing them to perform the lower-level database function. In (iii), SSD controller chip processor 452 may perform all of the higher-level database functions and SSD controller chip processor 452 may instruct flash memory chip controller 400 to perform all of the lower-level database functions.

In a specific example, a higher-level database function may include one or more lower-level database functions. In this regard, SSD controller chip processor 452 may instruct flash memory chip controller 400 to perform the one or more lower-level database functions and return the results of performing the one or more lower-level database functions to SSD controller chip processor 452.

Division of the functions based on higher-level functions being performed by SSD controller chip processor 452 and lower-level functions being performed by flash memory chip controller 400 is one example of hierarchy-type division of functions. Other hierarchy-type divisions of functions between the SSD controller chip processor 452 and flash memory chip controller 400 are contemplated.

Below are some examples of higher-level and lower-level functions for databases, image processing and file systems. The examples are for illustration purposes only. Other examples are contemplated. With regard to database functions, an example of a lower-level function is a search command for a particular entry and an example of a higher-level function is concatenating two sequences. In practice, SSD controller chip processor 452 may instruct flash memory chip controller 400 on one, some, or all of the flash memory chips (such as memory chip 0 (120) to memory chip N (126)) to search for the particular entry. Because the command may be performed in parallel at the flash memory chip level, the lower-level function of searching for the particular entry may be performed more quickly.

With regard to image processing, an example of a lower-level function is changing pixel values and an example of a higher-level function is increasing the contrast in an image. In practice, because performing the higher-level function of increasing the contrast includes the lower-level function of changing pixel values, SSD controller chip processor 452 may determine which pixels to change in order to increase the contrast, and thereafter instruct flash memory chip controller 400 In practice, SSD controller chip processor 452 may instruct flash memory chip controller 400, on one, some, or all of the flash memory chips that store the pixel values to be changed, to perform the function of changing the pixel values.

With regard to file system functions, examples of a lower-level functions include searching for a pointer, finding the beginning/end of file, and removing the content of the file. Examples of higher-level functions include deleting a file and opening a file. In practice, deleting a file (a higher-level function) includes one or more lower-level functions. In this regard, in response to the SSD controller chip processor 452 receiving a command to delete a file, the SSD controller chip 452 may determine in which flash memory chip(s) the file is stored, and send the lower-level commands to the flash memory chip(s) that are storing the file. Thus, the flash memory chips perform the lower-level commands to delete the file.

FIG. 5 illustrates a block diagram of another example of an SSD controller chip, illustrated as SSD controller chip 500. As discussed above, one or more flash memory chips may include mathematical computational functionality and/or logic functionality. In an alternate embodiment, SSD controller may include mathematical computational functionality and/or logic functionality. In this regard, all mathematical computational functionality and/or logic functionality attributed to the flash memory chips with regard to FIG. 3A may be, in the present embodiment, attributed to the SSD controller. The SSD controller may comprise an SSD controller chip 500, such as illustrated in FIG. 5. SSD controller chip 500 includes a host system interface 204, discussed above with respect to FIG. 2. Further, SSD controller chip 500 includes SSD controller chip processor 502, which includes ALU 504, counter 506, and FPU 508. ALU 504, counter 506, and FPU 508 is similar to ALU 306, counter 308, and FPU 310 resident in flash memory chip controller 300 except resident within SSD controller chip 500. Further, SSD controller chip 500 includes SSD controller memory 510. SSD controller memory 510 includes database operations software 512, image processing software 514, and file system software 516, which enables the SSD controller to perform database operations, image processing, and file system operations, such as discussed above.

In operation, SSD controller chip 500 may receive a communication from the host system, with the communication including a command and one or more LBA ranges. In response, SSD controller chip 500 may determine the function(s) responsive to the command. The functions may include performing one or more mathematical or logical operations on data stored at the one or more LBA ranges. Based on the one or more LBA ranges, the SSD controller chip 500 may determine the physical addresses of the data, send a request for the data, using the physical addresses, from the flash memory chips, and perform the operation(s) on the data returned from the flash memory chips.

Figure 6:
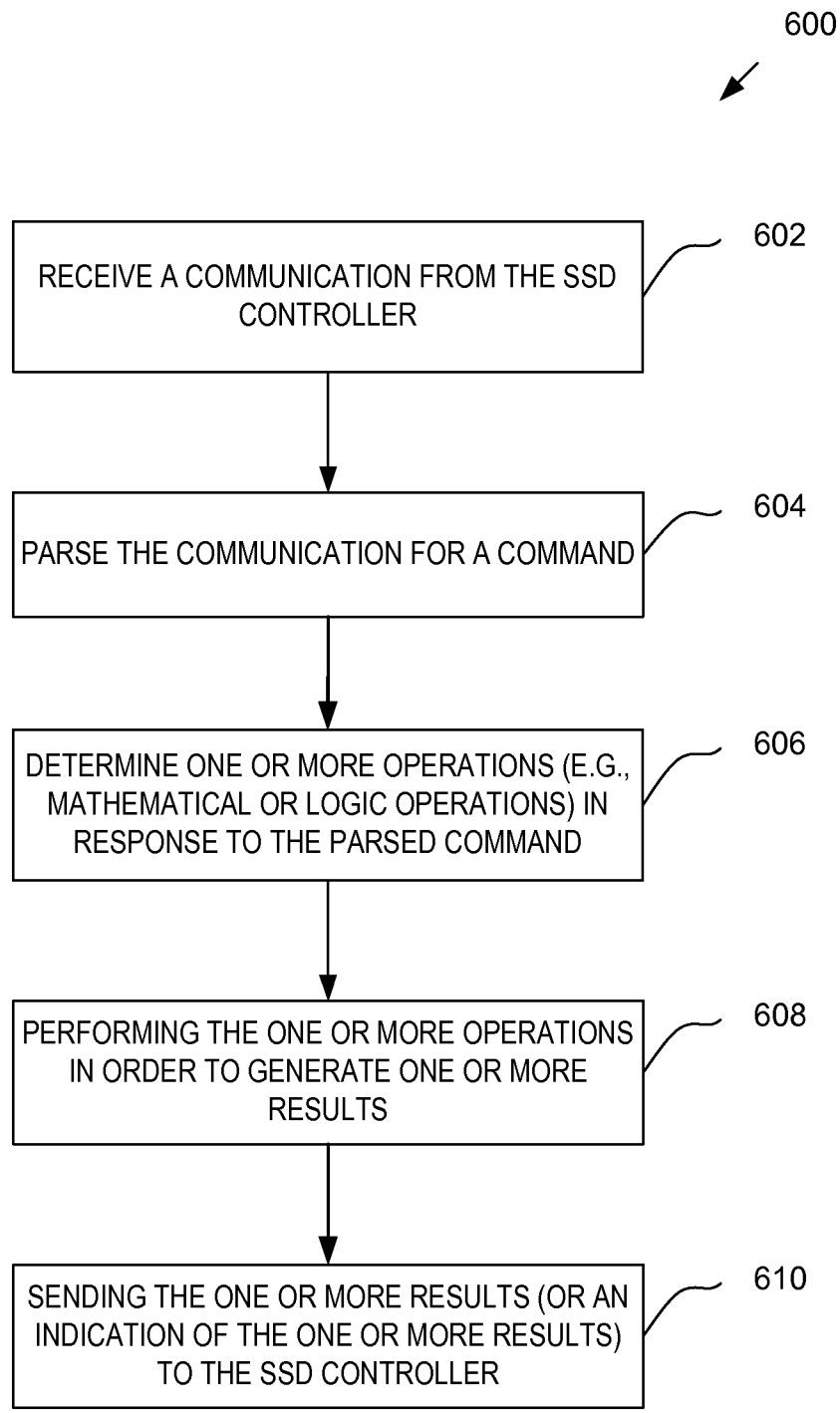
FIG. 6 illustrates a flow chart of actions performed by a flash memory chip controller.

FIG. 6 illustrates a flow chart 600 of actions performed by a part of a flash memory chip, such as flash memory chip controller 300. At 602, a communication is received from the SSD controller. At 604, the communication is parsed for a command. As discussed above, the flash memory chip controller 300 may receive different types of commands. The commands may relate to different functions, including without limitation, database management functions, image processing functions, and/or file system functions. At 606, one or more operations are determined based on the parsed command. For example, the flash memory chip controller 300 may parse the communication for the command in order to identify the command. The flash memory chip controller 300 may then correlate the identified command with one or more operations, such as one or more mathematical or logical operations. More specifically, the flash memory chip controller 300 may parse the communication and identify that the command is a schema search command. Using a look-up table which correlates commands to operations, the flash memory chip controller 300 may use the identified schema search command to determine which operation(s) the flash memory chip controller 300 is to perform. The operation(s) may comprise one or more mathematical operations that use ALU 306, counter 308, or FPU 310.

At 608, the one or more identified operations are performed in order to generate one or more results. As discussed above, an operation may comprise using an ALU (or other mathematical or logical device). In one aspect, the ALU may use one or more operand registers to perform the mathematical or logical operation. The flash memory chip controller 300 may designate a part of memory as the operand register(s) and load data into the operand register(s). For example, the flash memory chip controller 300 may load one or more pages into DDC and perform mathematical and/or logic functionality on part or all of the loaded pages. The use of the ALU may generate the one or more results, which may be stored in a part of the flash memory.

At 610, the one or more results (or an indication of the one or more results) may optionally be sent to the SSD controller, which may in turn send the results (or the indication of the results) to the host system. For example, the command may comprise an image processing command. The ALU may perform image processing generating results, which may be stored in the flash memory. Optionally, the results generated from the image processing may be sent to the SSD controller. In the example of an image processing command sent from the host system and forwarded by the SSD controller, the flash memory chip may send the results of performing the image processing to the host system via the SSD controller. In the example of a file system command, the flash memory chip may perform the file system command and send an indication of the results (such as an indication that the file system command was performed successfully).

Figure 7:
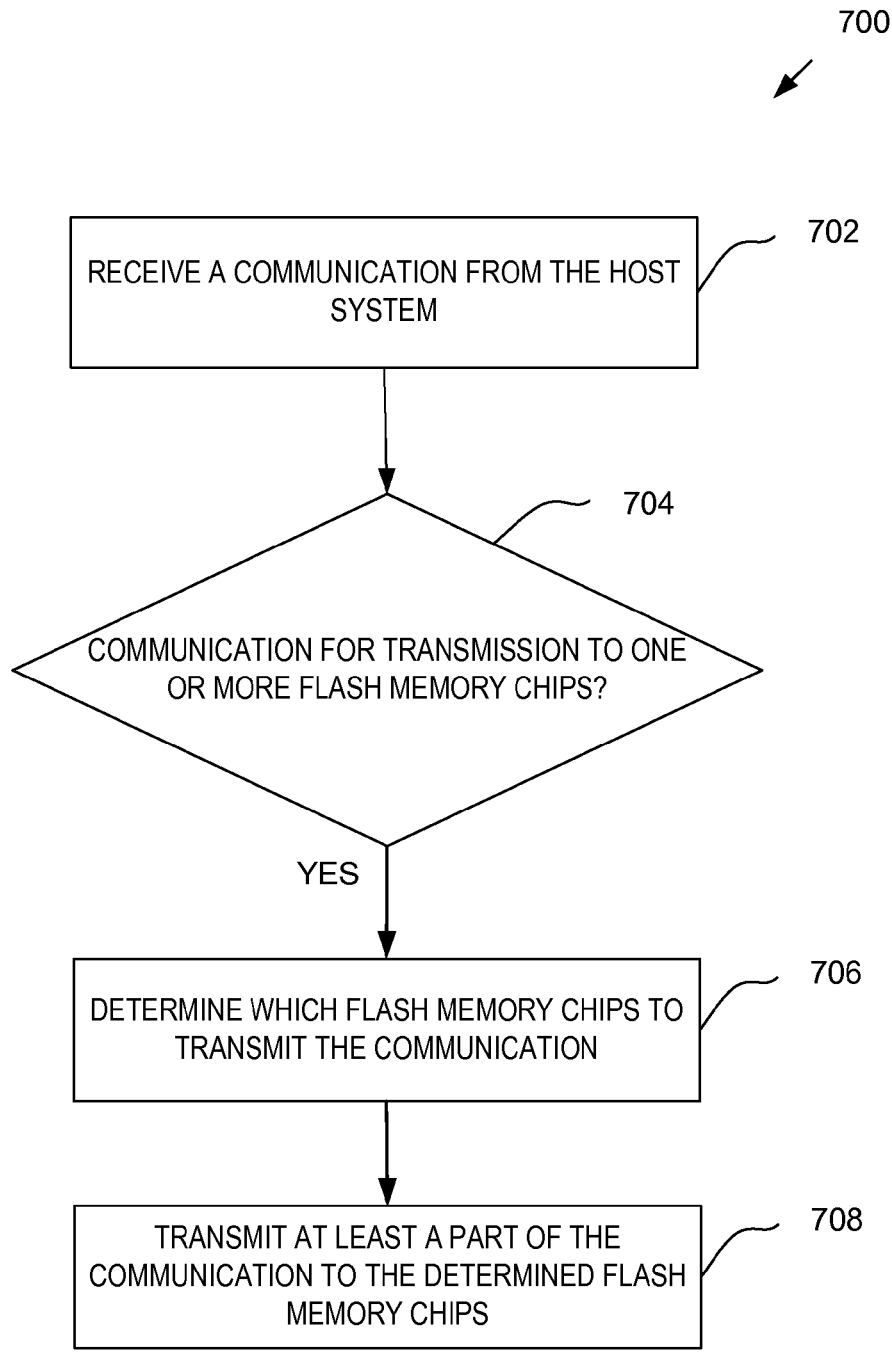
FIG. 7 illustrates a flow chart of actions performed by the SSD controller chip.

FIG. 7 illustrates a flow chart 700 of actions performed by a part of a flash memory chip, such as SSD controller chip 392. At 702, a communication is received from the host system. At 704, the communication is parsed to determine whether the communication is for transmission to one or more of the flash memory chips. For example, certain communications from the host system may indicate a function for the SSD controller to perform. As another example, other communications from the host system may indicate a function for the flash memory chips to perform (such as image processing, database management operations, or file system operations). In the latter instance, the SSD controller may forward a part or all of the communication to the flash memory chips. At 706, it is determined which flash memory chips to transmit the communication to. As discussed above, the communication may include one or more LBA ranges. The SSD controller may be configured to translate the one or more LBA ranges into physical addresses. In turn, a look-up table, correlating physical addresses to flash memory chips, may indicate which flash memory chips may indicate which flash memory chips to send the communication to based on the physical addresses. At 708, part or all of the communication is transmitted to the flash memory chips.

Semiconductor memory devices, such as discussed with respect to FIGS. 1-5, may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, e.g., a NOR memory array. One of skill in the art will recognize that the NAND and NOR memory configurations are exemplary, and memory elements may be otherwise configured.

The semiconductor memory elements of a single device, such as elements located within and/or over the same substrate or in a single die, may be distributed in two or three dimensions, such as a two dimensional array structure or a three dimensional array structure.

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer over which the layers of the memory elements are deposited and/or in which memory elements are formed or it may be a carrier substrate which is attached to the memory elements after they are formed.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, such as bit lines and word lines.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked memory planes. The columns may be arranged in a two dimensional configuration, e.g., in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single horizontal (e.g., x-z) plane. Alternatively, the memory elements may be connected together to extend through multiple horizontal planes. Other three dimensional configurations can be envisioned wherein some NAND strings contain memory elements in a single memory level while other strings contain memory elements which extend through multiple memory levels. Three dimensional memory arrays may also be designed in a NOR configuration and in a ReRAM configuration.

A monolithic three dimensional memory array is one in which multiple memory levels are formed above and/or within a single substrate, such as a semiconductor wafer. In a monolithic three dimensional array the layers of each level of the array are formed on the layers of each underlying level of the array. One of skill in the art will understand that layers of adjacent levels of a monolithic three dimensional memory array may be shared or have intervening layers between memory levels. In contrast, two dimensional arrays may be formed separately and then packaged together to form a non-monolithic memory device. For example, non-monolithic stacked memories have been constructed by forming memory levels on separate substrates and adhering the memory levels atop each other. The substrates may be thinned or removed from the memory levels before bonding, but as the memory levels are initially formed over separate substrates, such memories are not monolithic three dimensional memory arrays. Further, multiple two dimensional memory arrays or three dimensional memory arrays (monolithic or non-monolithic) may be formed separately and then packaged together to form a stacked-chip memory device.

One of skill in the art will recognize that this invention is not limited to the two dimensional and three dimensional exemplary structures described but cover all relevant memory structures within the spirit and scope of the invention as described herein and as understood by one of skill in the art.

Further, the present disclosure describes various functions, which may be implemented in hardware, in software, or in a combination of hardware and software. In one embodiment, the functions may be implemented using one or more sets of instructions, e.g. software, which may be embedded. Further, the instructions may perform one or more of the methods or logic as described herein, such as illustrated in FIGS. 6-7. The instructions may reside in various parts of the system. For example, the instructions may reside in the SSD controller chip (see FIGS. 3A, 3E, 5) and/or in the flash memory chip (such as the flash memory chip controller, see FIGS. 4A-B).

The instructions may be embodied in a computer-readable medium. The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A solid state drive (SSD) comprising:
  an SSD controller comprising an SSD controller arithmetic logic unit (ALU);
  one or more memory chips in communication with the SSD controller, the one or more memory chips comprising:
    memory; and
    a controller including mathematical computation functionality or logic functionality,
  wherein the SSD controller is configured to:
    receive a write command from a host device, the write command comprising one or more values;
    in response to receiving the write command, send a write instruction to the one or more memory chips to store the one or more values in the memory,
  wherein the SSD controller is further configured to:
    receive a command from the host device;
    in response to receiving the command, send an instruction to the one or more memory chips,
  wherein the one or more memory chips are configured to:
    responsive to receiving the instruction, use the mathematical computation functionality or the logic functionality of the controller on the one or more values previously stored in the memory of the memory chip in order to generate one or more results; and
    send at least a part of the one or more results or an indication of the one or more results to the SSD controller.

2. The SSD of claim 1, wherein the SSD is configured to perform a plurality of functions, the plurality of functions comprising a first set of functions and a second set of functions;
  wherein the SSD controller integrated circuit chip is configured to use the SSD controller ALU to perform the first set of functions; and
  wherein the one or more memory chips are configured to use a respective controller to perform the second set of functions on the one or more values stored in the memory.

3. The SSD of claim 2, wherein the first set of functions comprises higher-level functions; and
  wherein the second set of functions comprises lower-level functions.

4. The SSD of claim 3, wherein the SSD controller is configured to:
  review the command received from the host device;
  determine one or more lower-level functions to perform responsive to the received command;
  determine which of the one or more memory chips to send an instruction to perform the determined one or more lower-level functions; and
  send to the determined one or more memory chips the instruction to perform the determined one or more lower-level functions on the one or more values stored in the memory.

5. The SSD of claim 3, wherein the plurality of functions comprise at least one of database functions, image processing functions, or file system functions.

6. The SSD of claim 1, wherein the command from the host device comprises a search command;
  wherein, responsive to receipt of the search command, the controller is configured to send a search instruction to the one or more memory chips, the search instruction being indicative to the one or more memory chips to search for a data value;
  wherein a respective memory chip is configured to receive the search instruction; and
  wherein, responsive to receiving the search instruction, the controller of the respective memory chip is configured to determine whether the one or more values stored in the memory match the data value in order to generate the one or more results responsive to the search command.

7. The SSD of claim 6, wherein, responsive to receipt of the search command from the host device, the SSD controller is configured to determine one or more higher-level functions and one or more lower-level functions, at least one of the one or more lower-level functions comprises the search instruction;
  wherein the one or more higher-level functions are different from the one or more lower-level functions;
  wherein the SSD controller is configured to perform the one or more higher-level functions; and
  wherein the SSD controller is configured to command the one or more memory chips to perform the one or more lower-level functions.

8. The SSD of claim 1, wherein, responsive to receipt of a mathematical computation command from the host device, the SSD controller is configured to determine memory locations in the memory of a respective memory integrated circuit chip to perform the mathematical computation, wherein the mathematical computation instruction is indicative to perform a mathematical computation; and wherein, responsive to determining the memory locations in the memory of a respective memory integrated circuit chip to perform the mathematical computation, the SSD controller is configured to send an indication of the mathematical computation to the respective memory integrated circuit chip.

9. The SSD of claim 8, wherein the mathematical computation command comprises an image processing command.

10. The SSD of claim 1, wherein the one or more memory integrated circuit chips comprise one or more flash memory chips; and wherein the memory comprises flash memory.

11. A method for operating a solid state drive (SSD) having an SSD controller and a memory chip, the SSD controller comprising an SSD controller arithmetic logic unit (ALU), the memory chip including memory and a controller including mathematical computation functionality or logic functionality, the method comprising:

the SSD controller receiving, via an interface configured to communicate with a host device, a write command, the write command comprising one or more values;

responsive to receiving the write command, the SSD controller instructing the memory chip to store the one or more values in the memory;

the SSD controller receiving a command from the host device;

in response to receiving the command, the SSD controller sending an instruction to the memory chip, the memory chip, responsive to receiving the instruction, using the mathematical computation functionality or the logic functionality of the controller on the one or more values previously stored in the memory of the memory chip in order to generate one or more results; and the memory chip sending at least a part of the one or more results or an indication of the one or more results to the SSD controller.

12. The method of claim 11, wherein the SSD is configured to perform a plurality of functions, the plurality of functions comprising higher-level functions and lower-level functions;

wherein the SSD controller integrated circuit chip uses the SSD controller ALU to perform the higher-level functions; and wherein the memory chip uses the controller to perform the lower-level functions on the one or more values.

13. A memory chip configured for use in a solid state drive (SSD), the memory chip comprising:

an interface configured to communicate with an SSD controller for the SSD, the SSD controller configured to receive one or more values from a host device;

memory; and a controller in communication with the interface and the memory, the controller comprising searching functionality or computation functionality, and configured to:

receive a write command from the SSD controller, the write command indicative of writing the one or more values to the memory;

in response to receiving the write command, store the one or more values in the memory;

receive at least one search command from the SSD controller, the search command including a data entry;

in response to receiving the search command, use the searching functionality in order to determine whether the one or more values previously stored in the memory match the data entry in order to generate one or more results; and send at least a part of the one or more results or an indication of the one or more results to the SSD controller.

14. The memory chip of claim 13, wherein the search command comprises a database command, the database command comprising one of a schema search, insertion, deletion, or append.

15. The memory chip of claim 13, wherein the controller comprises:

a processor; and

ALU circuitry in communication with the processor, the ALU circuitry including an ALU and comprising the searching functionality and the computational functionality.

16. The memory chip of claim 13, wherein the controller comprises a processor; and wherein the processor is configured as an ALU by executing instructions in order to generate the searching functionality and the computational functionality.

17. The memory chip of claim 13, wherein the memory comprises a first block and a second block;

wherein a first ALU is assigned to the first block; and wherein a second ALU is assigned to the second block.

18. The memory chip of claim 13:

wherein the memory comprises a block, the block comprising a plurality of bit lines; and wherein a separate ALU is assigned to each of the plurality of bit lines in the block.

19. A method for operating a memory integrated circuit chip configured for use in a solid state drive (SSD), the memory integrated circuit chip having a memory, the method comprising:

receiving a write command from the SSD controller, the write command indicative of writing one or more values to the memory;

in response to receiving the write command, storing the one or more values in the memory;

receiving at least one search command from the SSD controller, the search command including a data entry;

in response to receiving the search command, using the searching functionality in order to determine whether the one or more values previously stored in the memory match the data entry in order to generate one or more results; and sending at least a part of the one or more results or an indication of the one or more results to the SSD controller.

20. The method of claim 19, wherein the search command comprises a database command, the database command comprising one of a schema search, insertion, deletion, or append.

21. A memory integrated circuit chip configured for use in a solid state drive (SSD), the memory integrated circuit chip comprising:

an interface configured to communicate with an SSD controller for the SSD, the SSD controller configured to receive one or more values from a host device;

memory; and a controller in communication with the interface and the memory, the controller comprising searching functionality or computation functionality, and configured to:

receive a write command from the SSD controller, the write command indicative of writing the one or more values to the memory;

in response to receiving the write command, store the one or more values in the memory;

receive a mathematical computation instruction, the mathematical computation instruction being indicative to perform a mathematical computation;

responsive to receiving the mathematical computation instruction, perform the mathematical computation on the one or more values in order to generate one or more results; and send at least a part of the one or more results or an indication of the one or more results to the SSD controller.

22. The memory integrated circuit chip of claim 21, wherein the mathematical computation command comprises an image processing command.

23. The memory integrated circuit chip of claim 21, wherein the memory comprises flash memory.

24. The memory integrated circuit chip of claim 21, wherein the controller comprises:

a processor; and

ALU circuitry in communication with the processor, the ALU circuitry including an ALU and comprising the searching functionality and the computational functionality.

25. The memory integrated circuit chip of claim 21, wherein the controller comprises a processor; and wherein the processor is configured as an ALU by executing instructions in order to generate the searching functionality and the computational functionality.

* * * * *